US011822225B2

United States Patent
Moon et al.

(10) Patent No.: US 11,822,225 B2
(45) Date of Patent: Nov. 21, 2023

(54) ELECTRONIC APPARATUS AND CONTROL METHOD THEREOF

(71) Applicant: Samsung Electronics Co., Ltd., Suwon-si (KR)

(72) Inventors: Seunghyun Moon, Suwon-si (KR); Hakjae Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1 day.

(21) Appl. No.: 17/586,408

(22) Filed: Jan. 27, 2022

(65) Prior Publication Data

US 2022/0283487 A1    Sep. 8, 2022

Related U.S. Application Data

(63) Continuation of application No. PCT/KR2022/000457, filed on Jan. 11, 2022.

(30) Foreign Application Priority Data

Mar. 8, 2021  (KR) .......................... 10-2021-0030431
Sep. 27, 2021  (KR) .......................... 10-2021-0127350

(51) Int. Cl.
*G03B 21/56*    (2006.01)
*H04N 9/31*    (2006.01)

(52) U.S. Cl.
CPC ........... *G03B 21/56* (2013.01); *H04N 9/3173* (2013.01)

(58) Field of Classification Search
CPC ...... G03B 21/56; G03B 21/562; G03B 21/58; G03B 21/64; G03B 21/145; H04N 9/3141;

(Continued)

(56) References Cited

U.S. PATENT DOCUMENTS 6,873,460 B1 *  3/2005  Burstyn ................... H04N 5/74
                                                                          359/461
10,013,955 B2   7/2018  Oh et al.
(Continued)

FOREIGN PATENT DOCUMENTS

CN          111381431 A        7/2020
JP          2012-257071       12/2012
(Continued)

OTHER PUBLICATIONS

International Search Report dated May 2, 2022, in International Application No. PCT/KR2022/000457.
(Continued)

*Primary Examiner* — Sultan Chowdhury
(74) *Attorney, Agent, or Firm* — STAAS & HALSEY LLP

(57) ABSTRACT

An electronic apparatus includes a projector, an input/output interface, a memory, and a processor that controls the electronic apparatus by executing at least one instruction stored in the memory. The processor obtains screen information of a screen device connected to the electronic apparatus, controls the input/output interface to transmit first operation information corresponding to an unrolling of the screen device in response to receiving a user command to project an image, and controls the projector to project a first image to at least a partial region of a region in which a screen of the screen device is exposed based on the screen information while the screen of the screen device is being unrolled, based on the first operation information.

18 Claims, 20 Drawing Sheets

(58) Field of Classification Search
CPC ... H04N 9/3173; H04N 9/3185; H04N 9/3194
See application file for complete search history.

(56) References Cited

U.S. PATENT DOCUMENTS

| | | |
|---|---|---|
| 10,490,169 B2 | 11/2019 | Oh et al. |
| 10,613,587 B2 | 4/2020 | Hong et al. |
| 10,916,226 B2 | 2/2021 | Oh et al. |
| 11,003,218 B2 | 5/2021 | Hong et al. |
| 11,164,544 B2 | 11/2021 | Yun |
| 2005/0012907 A1 | 1/2005 | Inoue |
| 2010/0128228 A1* | 5/2010 | Matsuo ............. G03B 21/30 353/30 |
| 2015/0256803 A1* | 9/2015 | Alhazme ............ G03B 21/56 348/746 |
| 2016/0062486 A1* | 3/2016 | Bozyk ............... H04N 9/3194 345/156 |
| 2017/0024031 A1* | 1/2017 | Ueda ................. G09G 5/003 |
| 2017/0099471 A1 | 4/2017 | Kim et al. |
| 2017/0103735 A1 | 4/2017 | Oh et al. |
| 2018/0301124 A1 | 10/2018 | Oh et al. |
| 2018/0342225 A1 | 11/2018 | Yun |
| 2019/0064883 A1 | 2/2019 | Hong et al. |
| 2020/0058272 A1 | 2/2020 | Oh et al. |
| 2020/0201395 A1 | 6/2020 | Hong et al. |
| 2022/0013086 A1 | 1/2022 | Yun |

FOREIGN PATENT DOCUMENTS

| | | |
|---|---|---|
| JP | 2014-48617 | 3/2014 |
| JP | 5811606 B2 | 11/2015 |
| KR | 10-2004-0024936 | 3/2004 |
| KR | 10-0506853 B1 | 8/2005 |
| KR | 10-0893836 B1 | 4/2009 |
| KR | 10-2012-0092127 A | 8/2012 |
| KR | 10-2016-0017081 A | 2/2016 |
| KR | 10-2017-0043347 A | 4/2017 |
| KR | 10-2018-0128261 | 12/2018 |
| KR | 10-1938373 B1 | 1/2019 |
| KR | 10-2019-0022157 A | 3/2019 |
| WO | WO 2012/032669 A1 | 3/2012 |
| WO | WO 2014/197852 A1 | 12/2014 |

OTHER PUBLICATIONS

Written Opinion of the International Searching Authority dated May 2, 2022, in International Application No. PCT/KR2022/000457.

* cited by examiner

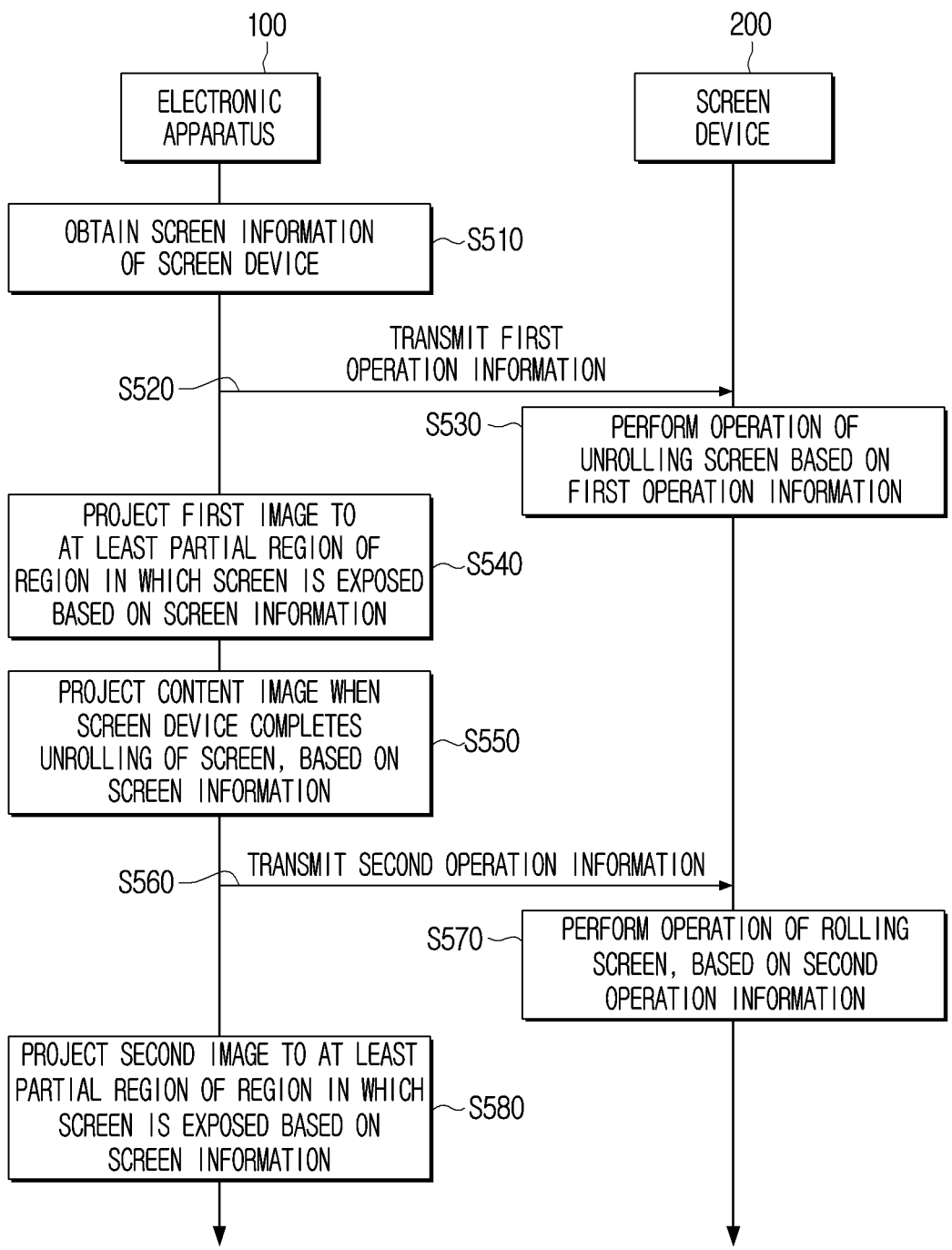

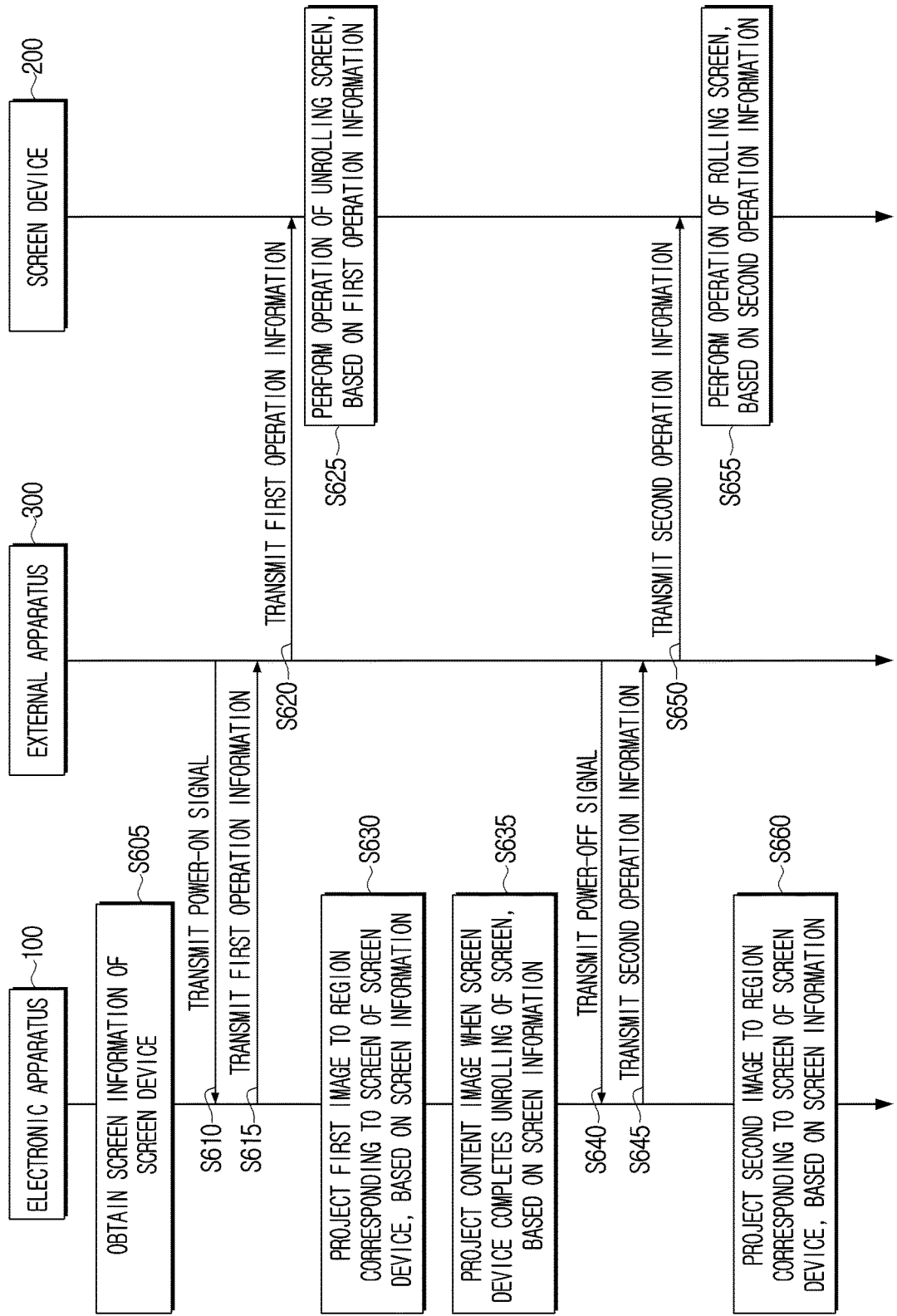

ELECTRONIC APPARATUS AND CONTROL METHOD THEREOF

CROSS-REFERENCE TO RELATED APPLICATIONS

This application is a continuation of International Application No. PCT/KR2022/000457, filed on Jan. 11, 2022, which is based on and claims priority to Korean Patent Application No. 10-2021-0030431, filed on Mar. 8, 2021, in the Korean Intellectual Property Office, and Korean Patent Application No. 10-2021-0127350, filed on Sep. 27, 2021, in the Korean Intellectual Property Office. The disclosures of each of International Application No. PCT/KR2022/000457, Korean Patent Application No. 10-2021-0030431, and Korean Patent Application No. 10-2021-0127350, are incorporated by reference herein in their entireties.

BACKGROUND

1. Field

Apparatuses and methods described in the disclosure relate to an electronic apparatus that projects a projected image, and a control method thereof. For example, the disclosure relates to an electronic apparatus that projects an image while a screen device is operated, and a control method thereof.

2. Description of the Related Art

An electronic apparatus having various optical output functions has been developed with the development of technology. For example, there may be a display apparatus, a lighting apparatus, a portable communication apparatus and a projector. Among these examples, the projector is an electronic apparatus expanding and projecting output light from a light source to a wall or a screen through a projection lens.

With the development of projector technology, the projector may provide a projected image by using a screen device having a large screen. There is thus an increasing demand for projecting the image only to a region in which the screen is exposed when the screen of the screen device is unrolled or rolled.

SUMMARY

The disclosure provides an electronic apparatus that projects an image to a partial region of a region in which a screen is exposed while a screen device is operated, and a control method thereof.

According to an embodiment of the disclosure, an electronic apparatus includes a projector, an input/output interface, a memory, and a processor that is configured to control the electronic apparatus by executing at least one instruction stored in the memory to obtain screen information of a screen device connected to the electronic apparatus, control the input/output interface to transmit first operation information corresponding to an unrolling of the screen device in response to receiving a user command to project an image, and control the projector to project a first image to at least a partial region of a region in which a screen of the screen device is exposed based on the screen information while the screen of the screen device is being unrolled, based on the first operation information.

In addition, the processor may control the input/output interface to transmit second operation information corresponding to rolling of the screen device in response to receiving a user command not to project the image, and may control the projector to project a second image to the at least the partial region of the region in which the screen is exposed based on the screen information while the screen is being rolled, based on the second operation information.

In addition, the processor may obtain motion information of the screen while the screen device unrolls the screen, based on the first operation information, and may control the projector to correct the first image, based on the obtained motion information, and to project the corrected first image.

In addition, the processor may obtain the motion information, based on information on a distance between an upper end of the screen and the electronic apparatus while the screen device unrolls the screen, based on the first operation information.

In addition, the processor may obtain vibration information of the screen by using a vibration sensor while the screen device unrolls the screen, based on the first operation information, and may control the projector to correct the first image, based on the vibration information, and to project the corrected first image to the at least the partial region of the region in which the screen is exposed.

In addition, the processor may control the projector to project a third image when the motion information has a value greater than or equal to a predetermined value.

In addition, the processor may control the projector to, after the screen device unrolls the screen based on the first operation information, project the first image to the at least the partial region of the region in which the screen is exposed after a first time elapses.

In addition, the processor may control the input/output interface to transmit the first operation information to an external apparatus controlling the electronic apparatus by using a first communication method in response to receiving power-on information of the electronic apparatus from the external apparatus, and may control the projector to project the first image to the at least the partial region of the region in which the screen is exposed while the screen is being unrolled as the external apparatus transmits the first operation information to the screen device by using a second communication method.

In addition, the processor may control the input/output interface to receive, from the screen device, the first operation information corresponding to unrolling of the screen device, may control the projector to project the first image to the at least the partial region of the region in which the screen is exposed based on the first operation information, and may control the projector to project a content image different from the first image in response to receiving, from the screen device, third operation information indicating that the screen device completes the unrolling of the screen.

In addition, the processor may control the input/output interface to receive, from the screen device which receives the first operation information, state information indicating that the screen device is unable to unroll the screen, and may allow information indicating that the screen device is unable to unroll the screen to be provided based on the state information.

According to another embodiment of the disclosure, a method of an electronic apparatus includes obtaining screen information of a screen device connected to the electronic apparatus, transmitting first operation information corresponding to an unrolling of the screen device in response to receiving a user command to project an image, and projecting a first image to at least a partial region of a region in which a screen of the screen device is exposed based on the screen information while the screen of the screen device is being unrolled, based on the first operation information.

In addition, the method may further include transmitting second operation information corresponding to rolling of the screen device in response to receiving a user command not to project the image, and projecting a second image to the at least the partial region of the region in which the screen is exposed based on the screen information while the screen is being rolled, based on the second operation information.

In addition, the projecting may include obtaining motion information of the screen while the screen device unrolls the screen, based on the first operation information, and correcting the first image, based on the obtained motion information, and projecting the corrected first image.

In addition, the obtaining of the motion information may include obtaining the motion information, based on information on a distance between an upper end of the screen and the electronic apparatus while the screen device unrolls the screen, based on the first operation information.

In addition, the method may further include obtaining vibration information of the screen by using a vibration sensor while the screen device unrolls the screen, based on the first operation information, and correcting the first image, based on the vibration information, and projecting the corrected first image to the at least the partial region of the region in which the screen is exposed.

In addition, the projecting may include projecting a third image when the motion information has a value greater than or equal to a predetermined value.

In addition, the projecting may include, after the screen device unrolls the screen based on the first operation information, projecting the first image to the at least the partial region of the region in which the screen is exposed after a first time elapses.

In addition, the method may further include transmitting the first operation information to an external apparatus controlling the electronic apparatus by using a first communication method in response to receiving power-on information of the electronic apparatus from the external apparatus, and projecting the first image to the at least the partial region of the region in which the screen is exposed while the screen is being unrolled as the external apparatus transmits the first operation information to the screen device by using a second communication method.

In addition, the method may further include receiving, from the screen device, the first operation information corresponding to unrolling of the screen device, projecting the first image to the at least the partial region of the region in which the screen is exposed based on the first operation information, and projecting a content image different from the first image in response to receiving, from the screen device, third operation information indicating that the screen device completes the unrolling of the screen.

In addition, the method may further include receiving, from the screen device which receives the first operation information, state information indicating that the screen device is unable to unroll the screen, and providing information indicating that the screen device is unable to unroll the screen, based on the state information.

Additional and/or other aspects and advantages of the disclosure are set forth in part in the description and, in part, are apparent from the description, or may be learned by practice of the example embodiments disclosed herein.

BRIEF DESCRIPTION OF THE DRAWINGS

The above and/or other aspects, features, and advantages of the example embodiments of the disclosure will become more apparent and more readily appreciated from the following description of embodiments of the disclosure, taken in conjunction with reference to the accompanying drawings, of which:

FIG. 5 is a flowchart showing the electronic apparatus interoperating with the screen device, according to an embodiment of the disclosure;

FIG. 6 is a flowchart showing an example in which an external apparatus controls the electronic apparatus and the screen device, according to an embodiment of the disclosure;

DETAILED DESCRIPTION

Figure 1:
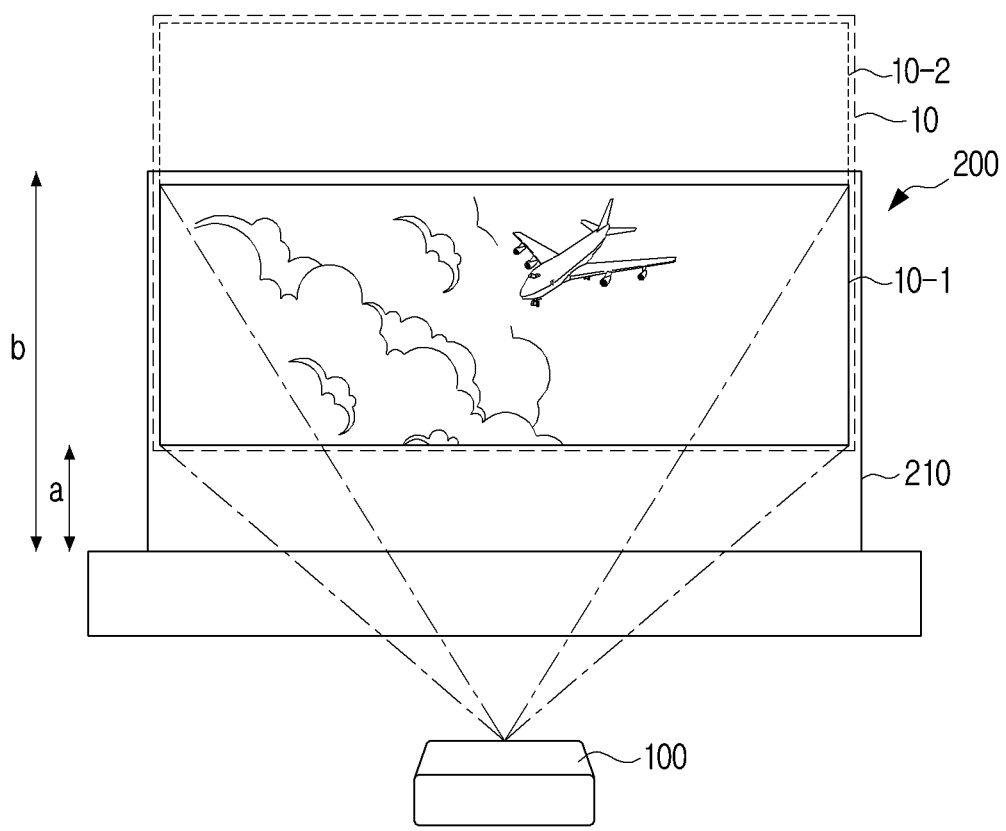
FIG. 1 is a view showing an operation of an electronic apparatus based on a screen device according to an embodiment of the disclosure.

Embodiments described in the disclosure and configurations shown in the drawings are merely examples of the embodiments of the disclosure, and may be modified in various different ways to replace the embodiments and drawings of the disclosure. The disclosure will be described more fully hereinafter with reference to the accompanying drawings, wherein like reference characters refer to like elements.

FIG. 1 is a view showing an operation of an electronic apparatus based on a screen device, according to an embodiment of the disclosure.

An electronic apparatus 100 according to the disclosure may be an apparatus of any of various types. In particular, the electronic apparatus 100 may be a projector apparatus that expands and projects an image to a wall or a screen, and the projector apparatus may be a digital light processing (DLP) type projector using an LCD projector or a digital micromirror device (DMD).

In addition, the electronic apparatus 100 may be a home or industrial display apparatus, may be a lighting apparatus used in daily life, or may be an audio apparatus including an audio module. The electronic apparatus 100 may be implemented as a portable communication apparatus (e.g., smartphone), a computer apparatus, a portable multimedia apparatus, a wearable apparatus or a home appliance apparatus. Meanwhile, the electronic apparatus 100 according to an embodiment of the disclosure is not limited to the above-described apparatuses, and may be implemented as the electronic apparatus 100 having two or more functions of the above-described apparatuses. For example, the electronic apparatus 100 may be used as the display apparatus, the lighting apparatus or the audio apparatus by turning off its projector function and turning on a lighting function or a speaker function, or may be used as an artificial intelligence (AI) speaker including a microphone or a communication apparatus, based on the operation of the processor.

Referring to FIG. 1, the electronic apparatus 100 according to the disclosure may project the image to at least a partial region of a region in which a screen 210 of a screen device 200 is exposed. For example, the screen device 200 may electrically unroll the screen 210 to unfold the screen 210, or electrically roll the screen 210 to fold the screen 210. In addition, the electronic apparatus 100 may project the image to the partial region of the region in which the screen 210 is exposed, while the screen 210 is unrolled or rolled.

Referring to FIG. 1, the screen device 200 may unfold the screen 210 by unrolling the screen 210 at a predetermined speed. Here, the predetermined speed may be predetermined by a manufacturer when the screen device 200 is manufactured or determined by a user. In addition, while the screen 210 is unrolled at the predetermined speed, the electronic apparatus 100 may project a first image to a 1-1-th region 10-1 of a region "b," in which the screen 210 is exposed. Here, the first image may be a welcome image provided while the screen 210 is unrolled. According to the disclosure, a size of the first image may be changed based on a size of the region in which the screen 210 is exposed. For example, the first image according to the disclosure may be projected to have the same animation effect as the image climbing up from the region while the region is expanded as the screen 210 is unrolled.

In addition, the first image for minimizing motion sickness of the user may be provided based on information on motion of the screen 210, as described below with reference to the following drawings.

When generally projected by the electronic apparatus 100, the image may be projected to a first region 10, and may thus also be projected to a 1-2-th region 10-2 in which the screen is not exposed. In this regard, the electronic apparatus 100 according to the disclosure may project the image only to the region in which the screen is exposed, by projecting the first image to the at least partial region of the region of the screen 210 of a height "b," when the screen 210 is unrolled by the height "b" at the predetermined speed. In an embodiment, the electronic apparatus 100 may project the first image to the region between a height "a" and the height "b" when the screen 210 is unrolled by the height "a." Here, the height "a" may be a minimum height of the screen at which the electronic apparatus 100 may project the image. That is, the electronic apparatus 100 may project the first image to the region of the screen 210 between the height "a" and the height "b," from a time point when the screen 210 reaches the height "a." In addition, when the screen 210 reaches its maximum height, the electronic apparatus 100 may project the image to an entire region of the screen 210.

In addition, when the region in which the screen is exposed is changed as the screen 210 is unrolled, the electronic apparatus 100 may project the first image whose size is changed to correspond to the changed region.

Figure 2A:
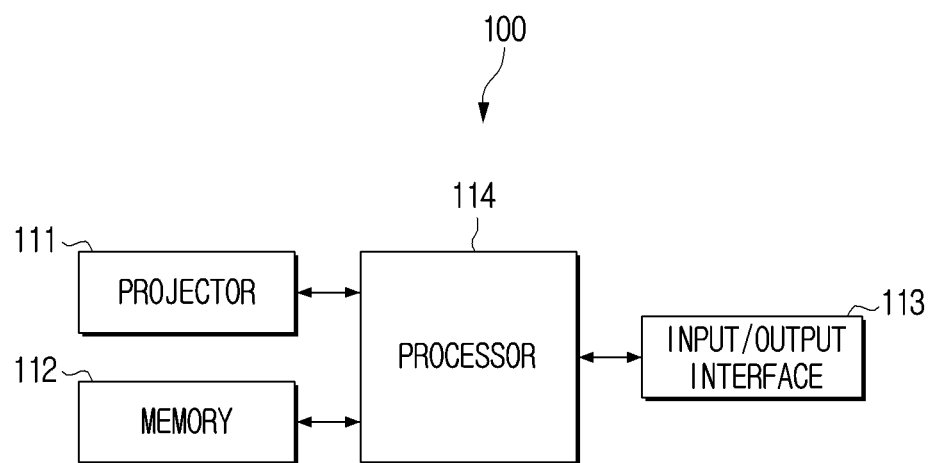
FIG. 2A is a block diagram showing the electronic apparatus according to an embodiment of the disclosure.

FIG. 2A is a block diagram showing the electronic apparatus according to an embodiment of the disclosure.

Referring to FIG. 2A, the electronic apparatus 100 includes a projector 111, a memory 112, an input/output interface 113 and a processor 114.

The projector 111 may perform a function of outputting the image to a projection plane. A detailed description of the projector 111 is described with reference to FIG. 2B. Here, although described as the projector, the electronic apparatus 100 may project the image in various ways. Here, the projector 111 may include a projection lens. Here, the projection plane may be a portion of a physical space where the image is output, or may be a separate screen.

The memory 112 according to the disclosure may store screen information of the screen device. A detailed description of the memory 112 is described with reference to FIG. 2B.

The input/output interface 113 is a component for performing communication with an external apparatus. In detail, the input/output interface 113 may transmit a control instruction to the external apparatus and receive the control instruction therefrom. In addition, the input/output interface 113 may perform the communication with the external apparatus to input/output at least one of an audio signal or an image signal. A detailed description of the input/output interface 113 is described with reference to FIG. 2B.

The processor 114 may perform an overall control operation of the electronic apparatus 100. In detail, the processor 114 may obtain the screen information of the screen device 200 connected to the electronic apparatus 100. The screen information according to the disclosure may include information on a size of the screen 210, first screen information on a speed at which the screen 210 is unfolded as the screen 210 of the screen device 200 is unrolled, and second screen information on a speed at which the screen 210 is folded as the screen 210 is rolled. For example, the processor 114 may obtain, as the screen information, the screen information of the screen device 200 among information on the plurality of screen devices pre-stored in the memory 112 or an external server, based on the manufacturer and product name of the screen device 200.

In addition, the processor 114 may obtain information on a first time at which an upper end of the screen 210 reaches a minimum height of the image projected by the electronic device 100 and information on a second time at which the screen reaches its maximum height when the screen 210 is unrolled based on the first screen information. The processor 114 may also obtain information on a third time at which the upper end of the screen 210 reaches the minimum height of the image projected by the electronic device 100 when the screen 210 is rolled based on the second screen information.

For example, the processor 114 may obtain the information on the first time, the second time, and the third time based on the screen information and information on a distance between the electronic apparatus 100 and the screen device 200.

In addition, when receiving a user command to project the image, the processor 114 may control the input/output interface 113 to transmit first operation information corresponding to unrolling of the screen device (first operation information instructing the screen device 200 to unroll a screen) to the screen device 200.

According to the disclosure, the user command to project the image may be a user command to turn on power of the electronic apparatus 100 or the user command to project the image by using the electronic apparatus 100. In addition, the electronic apparatus 100 may receive the user command to project the image from the external apparatus that may control the electronic apparatus 100, or may receive the user command to project the image through a physical button included in the electronic apparatus 100.

According to the disclosure, the first operation information may include a control instruction to unroll the screen 210. When receiving the first operation information, the screen device 200 may unroll the screen, based on the first operation information. That is, when receiving the first operation information, the screen device 200 may unroll the screen 210 at a speed corresponding to the first screen information. In an embodiment, the processor 114 may control the input/output interface 113 to transmit the first operation information to the screen device 200 in an infrared ray (IR) communication method or a radio frequency (RF) communication method. However, the above-described communication methods may be used only when the screen device 200 is only possible to receive the information and impossible to transmit the information. That is, when the screen device 200 is implemented to receive the information from the electronic apparatus 100, the electronic apparatus 100 and the screen device 200 may communicate with each other by using various methods such as a WiFi method, a Bluetooth method, the IR communication method, the RF communication method, an Ethernet method and a universal asynchronous receiver/transmitter (UART) method, which is described below with reference to the following drawings.

In addition, the processor 114 may control the projector 111 to project the first image to the at least partial region of the region in which the screen 210 is exposed based on the screen information while the screen 210 of the screen device 200 is unrolled based on the first operation information. Here, the first image may be the welcome image provided while the screen 210 is unrolled. According to the disclosure, a size of the welcome image may be changed based on the size of the region in which the screen 210 is exposed. In addition, the welcome image for minimizing the motion sickness of the user may be provided based on the motion information of the screen 210, as described below with reference to the following drawings.

In an embodiment, after the screen device 200 starts to unroll the screen 210 based on the first operation information, the processor 114 may control the projector 111 to project the first image to the region in which the screen is exposed after the first time. Here, the first time may be a time at which the upper end of the screen 210 reaches the minimum height of the image projected by the electronic device 100, and may be identified based on the information on the first time.

However, the disclosure is not limited thereto. In an embodiment of the disclosure, the electronic device 100 may include the projector 111 capable of vertically shifting the lens or the projector 111 may have a projection region adjustable made by a motor. In this case, the projector 111 may project the first image from a time point when the screen device 200 starts to unroll the screen 210.

In addition, the processor 114 may control the projector 111 to project a content image when the screen device 200 completes the unrolling of the screen, based on the screen information. The content image according to the disclosure may be an image provided by the electronic apparatus 100 or an image provided by the external apparatus connected to the electronic apparatus 100.

In addition, the processor 114 may control the input/output interface 113 to transmit second operation information corresponding to rolling of the screen device 200 (second operation information instructing the screen device 200 to roll the screen) to the screen device 200 when receiving a user command not to project the image.

According to the disclosure, the user command not to project the image may be a user command to turn off the power of the electronic apparatus 100 or a user command not to project the image. In addition, the electronic apparatus 100 may receive the user command not to project the image from the external apparatus that may control the electronic apparatus 100, or may receive the user command not to project the image through the physical button included therein.

According to the disclosure, the second operation information may include a control instruction to roll the screen 210. The screen device 200 may roll the screen, based on the second operation information when receiving the second operation information. That is, the screen device 200 may roll the screen 210 at a speed corresponding to the second screen information when receiving the second operation information.

In addition, the processor 114 may control the projector 111 to project the second image to the at least partial region of the region in which the screen 210 is exposed based on the screen information while the screen 210 of the screen device 200 is rolled based on the second operation information. Here, the second image may be a farewell image provided while the screen 210 is rolled. According to the disclosure, a size of the farewell image may be changed based on the size of the region in which the screen 210 is exposed. For example, the second image according to the disclosure may be projected to have the same animation effect as the image climbing down from the region while the region is reduced as the screen 210 is rolled.

In addition, the farewell image for minimizing the motion sickness of the user may be provided based on the motion information of the screen 210, as described below with reference to the following drawings.

In an embodiment of the disclosure, while the first image and the second image are projected, the electronic device 100 may correct and project the first image and the second image, based on the motion information of the screen 210. In detail, the processor 114 may obtain the motion information of the screen 210 while the screen device unrolls the screen, based on the first operation information. In addition, the processor 114 may obtain the motion information of the screen 210 while the screen is rolled based on the second operation information.

That is, when the electronic apparatus 100 is an ultra-short throw projector apparatus, the electronic apparatus 100 and the screen device 200 may have a close distance therebetween. In this case, if the screen 210 of the screen device 200 is shaken as the screen 210 is rolled or unrolled, a horizontal size of the image projected to the screen 210 may be significantly changed even with such a small shake. The processor 114 according to the disclosure may thus provide the first image and the second image in consideration of the motion of the screen 210, based on the motion information of the screen 210.

In an embodiment of the disclosure, the processor 114 may obtain the motion information, based on the information on a distance between the upper end of the screen 210 and the electronic apparatus 100. For example, when the electronic apparatus 100 includes a sensor (e.g., a time of flight (Tof) sensor, depth sensor, or camera sensor) that identifies a distance from the sensor itself to an external object, the processor 114 may obtain the information on the distance between the upper end of the screen 210 and the electronic apparatus 100 by using the sensor. Here, if the sensor is implemented as the camera sensor, the processor 114 may control the projector 111 to output a separate test pattern and obtain the information on the distance between the upper end of the screen 210 and the electronic apparatus 100 by photographing the test pattern by using the camera. In addition, the processor 114 may obtain the information on the distance between the upper end of the screen 210 and the electronic apparatus 100 from an external sensor. However, the disclosure is not limited thereto, and the processor 114 may obtain the motion information, based on information on a distance between a central portion of the region in which the screen 210 is exposed and the electronic apparatus 100.

In an embodiment of the disclosure, when a vibration sensor is attached to the screen device 200, the processor 114 may obtain vibration information of the screen 210 by using the vibration sensor, and obtain the motion information of the screen 210, based on the vibration information. However, the disclosure is not limited thereto, and the vibration sensor may be positioned in the screen device 200. In detail, the processor 114 may detect a wavelength of the screen 210, based on the vibration information obtained by the vibration sensor, and obtain the motion information of the screen device 200, based on the detected wavelength.

In an embodiment of the disclosure, when a patch detectable by having a predetermined pattern is attached on the back side of the screen 210, the processor 114 may detect the patch by using the sensor to obtain the motion information of the screen device 200 while the screen 210 is unrolled or rolled.

In an embodiment of the disclosure, while the screen 210 is unrolled or rolled, a grid pattern in an invisible region such as an infrared region may be output, and the processor 114 may detect the grid pattern by using the sensor to obtain the motion information of the screen device 200.

In addition, while the first image is projected, the processor 114 may correct the first image, based on the motion information, and may control the projector 111 to project the corrected first image. In addition, while the second image is projected, the processor 114 may control the second image to be corrected based on the motion information, and may control the projector 111 to project the corrected second image. Each correction for the first image and the second image may include a keystone correction, and its details are described below with reference to FIG. 7B.

In an embodiment of the disclosure, the processor 114 may control the projector 111 to project a third image when the motion information has a value greater than or equal to a predetermined value while the first image is projected. That is, if the screen 210 has large motion while the screen 210 is unrolled or rolled, a third image may be projected to minimize the motion sickness of the user. Details of the third image are described below with reference to FIG. 7C.

In an embodiment of the disclosure, the electronic apparatus 100 and the screen device 200 may be controlled by an external apparatus 300 (see FIG. 6) which may control the electronic apparatus 100. In detail, the processor 114 may control the input/output interface 113 to transmit the first operation information to the external apparatus 300 controlling the electronic apparatus 100 by using the first communication method when receiving power-on information for turning on the power of the electronic apparatus 100 from the external apparatus 300 by using a first communication method. In addition, the external apparatus 300 may transmit the first operation information to the screen device 200 by using a second communication method, and when receiving the first operation information, the screen device 200 may unroll the screen 210, based on the first operation information. In addition, while the screen is unrolled, the processor 114 may control the projector 111 to project the first image to the at least partial region of the region in which the screen is exposed. For example, the first communication method may be the Bluetooth communication method, and the second communication method may be the IR communication method. The description describes an example of controlling the electronic apparatus 100 and the screen device 200 by using the external apparatus 300 below with reference to FIG. 6.

In an embodiment of the disclosure, the screen device 200 may be implemented to transmit state information of the screen device 200 to the electronic apparatus 100. In this case, the electronic apparatus 100 and the screen device 200 may communicate with each other by using various methods such as the WiFi method, the Bluetooth method, the IR communication method, the RF communication method, the Ethernet method, and the UART method. The processor 114 may control the input/output interface 113 to receive the first operation information corresponding to unrolling of the screen device 200 from the screen device 200 when the screen device 200 is implemented to transmit the information to the electronic apparatus 100. For example, when powered on, the screen device 200 may transmit the first operation information to the electronic apparatus 100. The processor 114 may control the projector 111 to project the first image to the at least partial region of the region in which the screen is exposed based on the first operation information when the electronic apparatus 100 receives the first operation information corresponding to unrolling of the screen device 200 from the screen device 200. In addition, the processor 114 may control the projector 111 to project the content image different from the first image when receiving third operation information indicating that the screen device 200 completes the unrolling of the screen from the screen device 200. For example, the screen device 200 may transmit the third operation information to the electronic apparatus 100 when completing the unrolling of the screen. In addition, the processor 114 may control the input/output interface 113 to receive the second operation information corresponding to unrolling of the screen device 200 from the screen device 200. For example, when powered off, the screen device 200 may transmit the second operation information to the electronic apparatus 100. The processor 114 may control the projector 111 to project the second image to the at least partial region of the region in which the screen is exposed based on the second operation information when the electronic apparatus 100 receives the second operation information corresponding to rolling of the screen device from the screen device 200. The description describes a case, in which the screen device 200 is implemented to transmit the information to the electronic apparatus 100, in detail below with reference to FIG. 11.

In an embodiment of the disclosure, when implemented to transmit the information on its state to the electronic apparatus 100, the screen device 200 may transmit, to the electronic apparatus 100, the state information indicating that the screen device 200 is unable to unroll or roll the screen. For example, the screen device 200 may receive the first operation information from the electronic apparatus 100, and may be unable to unroll the screen 210 because the screen device 200 is overheated. In this case, the screen device 200 may transmit the state information indicating that the screen device 200 is unable to perform an unrolling of the screen to the electronic apparatus 100. For example, the screen device 200 may receive the first operation information from the electronic apparatus 100, and may be unable to unroll the screen 210 due to an external physical force applied to the screen device 200. In this case, the screen device 200 may transmit the state information indicating that the screen device 200 is unable to unroll the screen to the electronic apparatus 100. In detail, the screen device 200 may detect the external physical force that makes the screen 210 unable to unroll the screen, by using the sensor.

In addition, the processor 114 may control the input/output interface 113 to receive the state information indicating that the screen device 200 is unable to unroll the screen from the screen device 200, and may allow information indicating that the screen device 200 is unable to unroll the screen to be provided based on the state information. For example, the processor 114 may control the projector 111 to project a user interface (UI) image indicating that the screen device 200 is unable to unroll the screen. For example, the processor 114 may control an audio output device 116 described below with reference to FIG. 2B to output a voice informing that the screen device 200 is unable to unroll the screen. For example, the processor 114 may allow the information indicating that the screen device 200 is unable to unroll the screen to be transmitted to the external apparatus 300, thereby allowing the external apparatus 300 to display the UI image indicating that the operation of unrolling the screen is impossible or output the voice indicating that the operation of unrolling the screen is impossible.

The description describes that the screen 210 of the screen device 200 is unfolded by rising and being unrolled from the screen device 200 installed on the floor or the like with reference to FIGS. 1 and 2A. However, the disclosure is not limited thereto. The screen 210 may be unfolded by going down and being unrolled from the screen device 200 installed on a ceiling or the like, and an example of this case is described below with reference to FIG. 13.

Figure 2B:
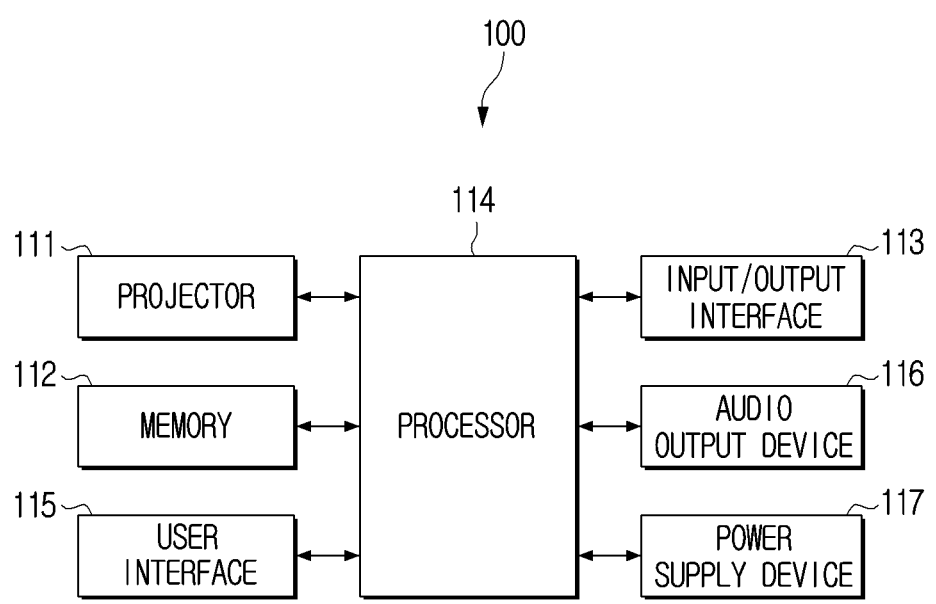
FIG. 2B is a block diagram showing a specific configuration of the electronic apparatus of FIG. 2A.

FIG. 2B is a block diagram showing an example configuration of the electronic apparatus of FIG. 2A.

Referring to FIG. 2B, the electronic apparatus 100 may include at least one of the projector 111, the memory 112, the input/output interface 113, the processor 114, a user interface 115, the audio output device 116, or a power supply device 117. Omitted here are the contents already described with reference to FIG. 2A among the descriptions of the projector 111, the memory 112, the input/output interface 113 and the processor 114. Meanwhile, the configuration shown in FIG. 2B is only an example embodiment, from which some configurations may thus be omitted, and to which a new configuration may be added.

The projector 111 may be a component that projects the image to an external source. According to an embodiment of the disclosure, the projector 111 may be implemented to have various projection types (e.g., cathode-ray tube (CRT) type, liquid crystal display (LCD) type, digital light processing (DLP) type, and laser type). For example, the CRT type may basically be the same as a CRT monitor. The CRT type may display the image on the screen by expanding the image by using a lens in front of a cathode-ray tube (CRT). According to the number of the CRTs, the CRT may be divided into a single tube type and a three tube type, and in case of the three tube type, red, green and blue CRTs may be implemented separately from one another.

For another example, the LCD type may display the image by allowing light emitted from a light source to transmit through a liquid crystal. The LCD type may be divided into a single-panel type and a three-panel type. In case of the three-plate type, the light emitted from the light source may be separated into red, green, and blue in a dichroic mirror (which is a mirror that reflects only light of a specific color and allows the rest to pass therethrough), may then pass through the liquid crystal, and may then be collected again.

For yet another example, the DLP type may display the image by using a digital micromirror device (DMD) chip. The DLP type projector may include a light source, a color wheel, a DMD chip, a projection lens, etc. Here, light output from the light source may be colored as the light passes through a rotating color wheel. The light passing through the color wheel may be input to the DMD chip. The DMD chip may include numerous micromirrors and reflect the light input to the DMD chip. The projection lens may serve to expend the light reflected from the DMD chip to a size of the image.

For yet still another example, the laser type may include a diode pumped solid state (DPSS) laser and a galvanometer. The laser type that outputs various colors may use a laser in which three DPSS lasers are respectively installed for a red-green-blue (RGB) color, and its optical axes overlap each other by using a special mirror. The galvanometer may move the mirror at high speed by including the mirror and a high-power motor. For example, the galvanometer may rotate the mirror at up to 40 KHz/sec. The galvanometer may be mounted based on a scan direction. In general, the projector may use a flatbed scanning, and the galvanometer may thus also be divided into x and y axes.

Meanwhile, the projector 111 may include various types of light sources. For example, the projector 111 may include at least one light source of a lamp, a light emitting diode (LED) and a laser.

The projector 111 may output the image in an aspect ratio of 4:3, an aspect ratio of 5:4, and a wide aspect ratio of 16:9, based on a purpose of the electronic apparatus 100, a user determination or the like, and may output the image having any of various resolutions such as wide video graphics array WVGA (854*480 pixels), super video graphics array SVGA (800*600 pixels), extended graphics array XGA (1024*768 pixels), wide extended graphics array WXGA (1280*720 pixels), WXGA (1280*800 pixels), super extended graphics array SXGA (1280*1024 pixels), ultra extended graphics array UXGA (1600*1200 pixels) and full high-definition HD (1920*1080 pixels), based on the aspect ratio.

Meanwhile, the projector 111 may perform various functions adjusting the output image under the control of the processor 114. For example, the projector 111 may perform a zoom function, a keystone function, a quick corner keystone (i.e., four-corner keystone) function, and a lens shift function.

In detail, the projector 111 may expand or reduce the image based on a distance from the screen (i.e., projection distance). That is, the projector 111 may perform the zoom function based on the distance from the screen. Here, the zoom function may include a hardware method in which a size of the screen is adjusted by moving a lens and a software method in which the size of the screen is adjusted by cropping the image. Meanwhile, when performing the zoom function, it is necessary to adjust a focus of the image. For example, a method of adjusting the focus may include a manual focusing method, an automatic focusing method, etc. The manual focusing method may be a method of manually focusing the image, and the automatic focusing method may be a method in which the projector automatically focuses the image by using a built-in motor when performing the zoom function. When performing the zoom function, the projector 111 may provide a digital zoom function by using software, and may provide an optical zoom function in which the zoom function is performed by moving the lens by using a driver.

In addition, the projector 111 may perform the keystone function. When a height does not match a front projection, the screen may be distorted up or down. The keystone function may be a function to correct the distorted screen. For example, when the distortion occurs on the screen in the left and right directions, the distortion may be corrected using a horizontal keystone, and when the distortion occurs on the screen in the vertical direction, the distortion may be corrected using a vertical keystone. The quick corner keystone (i.e., four-corner keystone) function may be a function to correct the screen when a center region of the screen is normally balanced and its corner regions are unbalanced. The lens shift function may be a function to move the screen as it is when the screen is off the screen.

Meanwhile, the projector 111 may provide the zoom/keystone/focus functions by automatically analyzing a surrounding environment and a projection environment without a user input. In detail, the projector 111 may automatically provide the zoom/keystone/focus functions, based on the distance between the electronic apparatus 100 and the screen, detected by the sensor (e.g., ToF sensor, distance sensor, infrared sensor or illumination sensor), information on a space where the electronic apparatus 100 is currently positioned, information on an amount of ambient light, etc.

In addition, the projector 111 may provide the lighting function by using the light source. In addition, the projector 111 may provide the lighting function by outputting the light source by using the LED. According to an embodiment, the projector 111 may include one LED, and according to another example, the electronic apparatus may include the plurality of LEDs. Meanwhile, the projector 111 may output the light source by using a surface-emitting LED based on an implementation example. Here, the surface-emitting LED may be an LED in which an optical sheet is disposed on an upper side of the LED for the light source to be evenly distributed and output. In detail, when the light source is output through the LED, the light source may be evenly distributed through the optical sheet and the light source dispersed through the optical sheet may be incident on a display panel.

Meanwhile, the projector 111 may provide the user with a dimming function to adjust intensity of the light source. In detail, when receiving the user input for adjusting the intensity of the light source from the user through a user interface 240 (e.g., touch display button or dial), the projector 111 may control the LED to output the intensity of the light source corresponding to the received user input.

In addition, the projector 111 may provide the dimming function, based on the content image analyzed by the processor 114 without the user input. In detail, the projector 111 may control the LED to output the intensity of the light source, based on information on the currently-provided content image (e.g., type or brightness of the content image).

Meanwhile, the projector 111 may control a color temperature under the control of the processor 114. Here, the processor 114 may control the color temperature, based on the content image. In detail, when the content image is identified is to be output, the processor 114 may obtain color information for each frame of the content image whose output is determined. In addition, the processor 114 may control the color temperature, based on the obtained color information for each frame. Here, the processor 114 may obtain at least one primary color of the frame, based on the color information for each frame. In addition, the processor 114 may adjust the color temperature, based on the at least one obtained primary color. For example, the color temperature that the processor 114 may adjust may be classified into a warm type or a cold type. Here, it may be assumed that a frame to be output (hereinafter, output frame) includes a fire scene. The processor 114 may identify (or obtain) that the primary color is a red color, based on the color information included in the current output frame. In addition, the processor 114 may identify the color temperature corresponding to the identified primary color (red). Here, the color temperature corresponding to the red color may be the warm type. Meanwhile, the processor 114 may use an artificial intelligence (AI) model to obtain the color information for the frame or the primary color. According to an embodiment, the artificial intelligence model may be stored in the electronic apparatus 100 (e.g., memory 112). According to another embodiment, the artificial intelligence model may be stored in the external server capable of communicating with the electronic apparatus 100.

Meanwhile, the electronic apparatus 100 may interoperate with an external device to control the lighting function. In detail, the electronic apparatus 100 may receive lighting information from the external device. Here, the lighting information may include at least one of brightness information or color temperature information determined by the external device. Here, the external device may be a device connected to the same network as the electronic apparatus 100 (e.g., internet of things (IoT) device included in the same home/work network) or a device not connected to the same network as the electronic apparatus 100 but capable of communicating with the electronic apparatus (e.g., remote control server). For example, it may be assumed that an external lighting device (e.g., IoT device) included in the same network as the electronic apparatus 100 outputs red light with a brightness of 50. The external lighting device (e.g., IoT device) may directly or indirectly transmit the lighting information (e.g., information indicating that the red light is output with the brightness of 50) to the electronic apparatus 100. Here, the electronic apparatus 100 may control the output of the light source, based on the lighting information received from the external lighting device. For example, the electronic apparatus 100 may output the red light with the brightness of 50 when the lighting information received from the external lighting device includes the information indicating that the red light is output with the brightness of 50.

Meanwhile, the electronic apparatus 100 may control the lighting function, based on biometric information. In detail, the processor 114 may obtain the user biometric information. Here, the biometric information may include at least one of a body temperature, a heart rate, a blood pressure, a respiration or an electrocardiogram of the user. Here, the biometric information may include various information in addition to the above-mentioned information. For example, the electronic apparatus may include a sensor measuring the biometric information. The processor 114 may obtain the user biometric information by using the sensor, and control the output of the light source based on the obtained biometric information. For another example, the processor 114 may receive the biometric information from the external device through the input/output interface 113. Here, the external device may be the portable communication device (e.g., smart phone or wearable device) of the user. The processor 114 may obtain the user biometric information from the external device, and control the output of the light source, based on the obtained biometric information. Meanwhile, according to an embodiment, the electronic apparatus may identify whether the user is sleeping and the processor 114 may control the output of the light source, based on the user biometric information when it is identified that the user is sleeping (or preparing to sleep).

The memory 112 may store at least one instruction on the electronic apparatus 100. In addition, the memory 112 may store an operating system O/S for driving the electronic apparatus 100. The memory 112 may also store various software programs or applications for operating the electronic apparatus 100 according to various embodiments of the disclosure. In addition, the memory 112 may include a semiconductor memory such as a flash memory, or a magnetic storing medium such as a hard disk.

In detail, the memory 112 may store various software modules for operating the electronic apparatus 100 according to various embodiments of the disclosure, and the processor 114 may execute various software modules stored in the memory 112 to control the operation of the electronic apparatus 100. That is, the memory 112 may be accessed by the processor 114, and the processor 114 may perform readout, recording, correction, deletion, update and the like of data in the memory 112.

Meanwhile, in the disclosure, the term "memory 112" may include the memory 112, a read only memory (ROM, not shown) or a random access memory (RAM, not shown) in the processor 114, or a memory card (not shown) mounted on the electronic apparatus 100 (e.g., a micro secure digital (SD) card or a memory stick).

The processor 114 may be one or more processors. Here, the one or more processors may each be a general-purpose processor such as a central processing unit (CPU) or an application processor (AP); a graphics-only processor such as a graphics-processing unit (GPU) or a visual processing unit (VPU); or an AI-only processor such as a neural processing unit (NPU).

The processor 114 may be electrically connected to the memory 112 to control an overall operation of the electronic apparatus 100. In detail, the processor 114 may allow at least one instruction stored in the memory 112 to be executed to control the electronic apparatus 100.

The user interface 115 may include various types of input apparatuses. For example, the user interface 115 may include a physical button. Here, the physical button may include a function key, a direction key (e.g., four-way key), or a dial button. According to an embodiment, the physical button may be implemented as a plurality of keys. According to another embodiment, the physical button may be implemented as one key. Here, when the physical button is implemented as the one key, the electronic apparatus 100 may receive the user input in which the one key is pressed for a threshold time or longer. When receiving the user input in which the one key is pressed for the threshold time or longer, the processor 114 may perform a function corresponding to the user input. For example, the processor 114 may provide the lighting function, based on the user input.

In addition, the user interface 115 may receive the user input by using a non-contact method. To receive the user input by using a contact method, a physical force may be required to be transmitted to the electronic apparatus. There may thus be a need for a method of controlling the electronic apparatus regardless of the physical force. In detail, the user interface 115 may receive a user gesture and may perform an operation corresponding to the received user gesture. Here, the user interface 115 may receive the user gesture by using a sensor (e.g., image sensor or infrared sensor).

In addition, the user interface 115 may receive the user input by using a touch method. For example, the user interface 115 may receive the user input by using a touch sensor. According to an embodiment, the touch method may be implemented as the non-contact method. For example, the touch sensor may determine whether a user body approaches within a threshold distance. Here, the touch sensor may identify the user input even when the user does not touch the touch sensor. Meanwhile, according to another embodiment, the touch sensor may identify the user input by which the user touches the touch sensor.

Meanwhile, the electronic apparatus 100 may receive the user input in various ways other than the user interface described above. In an embodiment, the electronic apparatus 100 may receive the user input by using an external remote control apparatus. Here, the external remote control apparatus may be a remote control apparatus corresponding to the electronic apparatus 100 (e.g., a control device dedicated to the electronic apparatus) or the portable communication device (e.g., smartphone or wearable device) of the user. Here, the portable communication device of the user may store an application for controlling the electronic apparatus. The portable communication device may obtain the user input from an application stored therein, and transmit the obtained user input to the electronic apparatus 100. The electronic apparatus 100 may receive the user input from the portable communication device and perform an operation corresponding to a user control instruction.

Meanwhile, the electronic apparatus 100 may receive the user input by using voice recognition. According to an embodiment, the electronic apparatus 100 may receive a user voice by using the microphone included in the electronic apparatus. According to another embodiment, the electronic apparatus 100 may receive the user voice from the microphone or the external apparatus. In detail, the external apparatus may obtain the user voice by using the microphone of the external apparatus, and transmit the obtained user voice to the electronic apparatus 100. The user voice transmitted from the external apparatus may be audio data or digital data converted from audio data (e.g., audio data converted into a frequency domain). Here, the electronic apparatus 100 may perform an operation corresponding to the received user voice. In detail, the electronic apparatus 100 may receive the audio data corresponding to the user voice by using the microphone. In addition, the electronic apparatus 100 may convert the received audio data into the digital data. In addition, the electronic apparatus 100 may convert the converted digital data into text data by using a speech-to-text (STT) function. According to an embodiment, the speech-to-text (STT) function may be directly performed in the electronic apparatus 100, and according to another embodiment, the speech-to-text (STT) function may be performed in the external server.

The electronic apparatus 100 may transmit the digital data to the external server. The external server may convert the digital data into the text data, and obtain control instruction data based on the converted text data. The external server may transmit the control instruction data (capable of also including the text data here) to the electronic apparatus 100. The electronic apparatus 100 may perform an operation corresponding to the user voice, based on the obtained control instruction data.

Meanwhile, the electronic apparatus 100 may provide a voice recognition function by using assistance (e.g., an AI assistant such as Bixby™), which is only an embodiment. The electronic device 100 may provide the voice recognition function by using a plurality of assistants. Here, the electronic apparatus 100 may provide the voice recognition function by selecting one of the plurality of assistants, based on a trigger word corresponding to the assistant or a specific key included in a remote controller.

Meanwhile, the electronic apparatus 100 may receive the user input by using a screen interaction. The screen interaction may refer to a function in which the electronic apparatus identifies whether a predetermined event is generated based on the image projected to the screen (or projection plane), and obtains the user input based on the predetermined event. Here, the predetermined event may be an event in which a predetermined object is identified at a specific position (e.g., position to which a user interface (UI) for receiving the user input is projected). Here, the predetermined object may include at least one of a user body part (e.g., finger), a pointer or a laser point. When the predetermined object is identified at the position corresponding to the projected UI, the electronic apparatus 100 may identify that the electronic apparatus 100 receives the user input for selecting the projected UI. For example, the electronic apparatus 100 may project a guide image displaying the UI on the screen. In addition, the electronic apparatus 100 may identify whether the user selects the projected UI. In detail, the electronic apparatus 100 may identify that the user selects the projected UI when the predetermined event is identified at the position of the projected UI. Here, the projected UI may include at least one item. Here, the electronic apparatus 100 may perform spatial analysis to identify whether the predetermined event is generated at the position of the projected UI. Here, the electronic apparatus 100 may perform the spatial analysis by using the sensor (e.g., image sensor, infrared sensor, ToF sensor or distance sensor). The electronic apparatus 100 may identify whether the predetermined event is generated at the specific position (to which the UI is projected) by performing the spatial analysis. In addition, when it is identified that the predetermined event is generated at the specific position (i.e., position to which the UI is projected), the electronic apparatus 100 may identify that the electronic apparatus 100 receives the user input for selecting the UI corresponding to the specific position.

The input/output interface 113 is a component for performing the communication with the external apparatus. For example, the input/output interface 113 may input and output at least one of the audio signal or the image signal by performing the communication with the external apparatus. The input/output interface 113 may receive at least one of the audio signal or the image signal from the external apparatus, and may output the control instruction to the external apparatus.

Meanwhile, in an embodiment of the disclosure, the input/output interface 113 may be implemented as a wired input/output interface of at least one of a high definition multimedia interface (HDMI), a mobile high-definition link (MHL), a universal serial bus (USB), a USB C-type, a display port (DP), a thunderbolt, a video graphics array (VGA) port, a red-green-blue (RGB) port, a D-subminiature (D-SUB) or a digital visual interface (DVI). According to an embodiment, the wired input/output interface may be implemented as an interface for inputting and outputting only the audio signal, an interface for inputting and outputting only the image signal, or one interface for inputting and outputting both the audio signal and the image signal.

In addition, the electronic apparatus 100 may receive the data by using the wired input/output interface, which is only an example embodiment. The electronic apparatus 100 may receive the power by using the wired input/output interface. For example, the electronic apparatus 100 may receive the power from an external battery by using the USB C-type or receive the power from an outlet by using a power adapter. For another example, the electronic apparatus may receive the power from the external apparatus (e.g., laptop computer or monitor) by using a display port (DP).

Meanwhile, in an embodiment of the disclosure, the input/output interface 113 may be implemented as the wireless input/output interface that performs the communication by using at least one of communication methods such as WiFi, WiFi direct, Bluetooth, ZigBee, third generation (3G), 3rd generation partnership project (3GPP) or long term evolution (LTE). According to an embodiment, a wireless input/output interface may be implemented as an interface for inputting and outputting only the audio signal, an interface for inputting and outputting only the image signal, or one interface for inputting and outputting both the audio signal and the image signal.

In addition, the audio signal may be input through the wired input/output interface, and the image signal may be input through the wireless input/output interface. Alternatively, the audio signal may be input through the wireless input/output interface, and the image signal may be input through the wired input/output interface.

The audio output device 116 may be a component that outputs the audio signal. For example, the audio output device 116 may include an audio output mixer, an audio signal processor, or an audio output module. The audio output mixer may synthesize the plurality of audio signals to be output into at least one audio signal. For example, the audio output mixer may synthesize an analog audio signal and another analog audio signal (e.g., analog audio signal received from the external source) into at least one analog audio signal. The audio output module may include a speaker or an output terminal. According to an embodiment, the audio output module may include the plurality of speakers. In this case, the audio output module may be disposed in the main body, and a sound emitted by covering at least a portion of a diaphragm of the audio output module may pass through a waveguide and be transmitted to the external source outside the main body. The audio output module may include a plurality of audio output units. The plurality of audio output units may be arranged symmetrically to each other on an exterior of the main body, so that the audio output module may emit the sound in all directions, i.e. 360 degrees.

The power supply device 117 may receive the power from the external source and supply the power to the various components of the electronic apparatus 100. The power supply device 117 according to an embodiment of the disclosure may receive the power by using various methods. In an embodiment, the power supply device 117 may receive the power by using a direct current (DC) power cord of 220 V. However, the power supply device 117 is not limited thereto, and may receive power by using a USB power cord or may receive power by using a wireless charging method.

In addition, the power supply device 117 may receive power by using an internal battery or the external battery. The power supply device 117 according to an embodiment of the disclosure may receive the power by using the internal battery. For example, the power supply device 117 may use at least one of the DC power cord of 220 V, the USB power cord, or a USB C-Type power cord to charge power of the internal battery, and may receive the power by using the charged internal battery. In addition, the power supply device 117 according to an embodiment of the disclosure may receive the power by using the external battery. For example, when the electronic apparatus and the external battery are connected to each other by using various wired communication methods such as the USB power cord, the USB C-Type power cord and a socket groove. That is, the power supply device 117 may directly receive power from the external battery, or charge the internal battery by using the external battery and receive the power from the charged internal battery.

The power supply device 117 according to the disclosure may receive power by using at least one of the plurality of power supply methods described above.

Meanwhile, with respect to power consumption, the electronic apparatus 100 may have the power consumption less than a predetermined value (e.g., 43 W) due to a socket type, another standard, etc. Here, the electronic apparatus 100 may change the power consumption to reduce the power consumption when using the battery. That is, the electronic apparatus 100 may change the power consumption based on the power supply method and power usage.

Meanwhile, the electronic apparatus 100 according to an embodiment of the disclosure may provide various smart functions.

In detail, the electronic apparatus 100 may be connected to a mobile terminal apparatus controlling the electronic apparatus 100, and a screen output from the electronic apparatus 100 may be controlled by the user input which is input from the mobile terminal apparatus. For example, the mobile terminal apparatus may be implemented as the smartphone including a touch display. Here, the electronic apparatus 100 may receive screen data which is provided by the mobile terminal apparatus from the mobile terminal apparatus, and output the received screen data, and the screen output from the electronic apparatus 100 may be controlled based on the user input which is input from the mobile terminal apparatus.

The electronic apparatus 100 may be connected to the mobile terminal apparatus by using various communication methods such as miracast, airplay, wireless dalvik executable (DEX) and a remote personal computer (PC) method, and may share a content or music, provided by the mobile terminal apparatus.

In addition, the mobile terminal apparatus and the electronic apparatus 100 may be connected to each other by using various connection methods. In an embodiment, the mobile terminal apparatus and the electronic apparatus 100 may be wirelessly connected to each other by searching the mobile terminal apparatus for the electronic apparatus 100, or by searching the electronic apparatus 100 for the mobile terminal apparatus. In addition, the electronic apparatus 100 may output the content provided by the mobile terminal apparatus.

In an embodiment, in a state in which a specific content or music is being output from the mobile terminal apparatus, the mobile terminal apparatus may be positioned near the electronic apparatus, and a predetermined gesture may then be detected by a display of the mobile terminal apparatus (by a motion tap view for example). In this case, the electronic apparatus 100 may output the content or music being output from the mobile terminal apparatus.

In an embodiment, in the state in which the specific content or music is being output from the mobile terminal apparatus, it may be detected that the mobile terminal apparatus is positioned near the electronic apparatus 100 by a predetermined distance or less (by a non-contact tap view for example), or the mobile terminal apparatus is in contact with the electronic apparatus 100 twice at short intervals (by a contact tap view for example). In this case, the electronic apparatus 100 may output the content or music being output from the mobile terminal apparatus.

The above embodiment describes that the screen provided by the mobile terminal apparatus is the same as the screen provided by the electronic apparatus 100. However, the disclosure is not limited thereto. That is, when the mobile terminal apparatus and the electronic apparatus 100 are connected to each other, the mobile terminal apparatus may output a first screen provided by the mobile terminal apparatus and, the electronic apparatus 100 may output a second screen provided by a mobile terminal apparatus, which is different from the first screen. For example, the first screen may be a screen provided by a first application installed on the mobile terminal apparatus, and the second screen may be a screen provided by a second application installed on the mobile terminal apparatus. For example, the first screen and the second screen may be different screens provided by one application installed on the mobile terminal apparatus. In addition, for example, the first screen may be a screen including a remote controller type UI for controlling the second screen.

The electronic apparatus 100 according to the disclosure may output a standby screen. For example, the electronic apparatus 100 may output the standby screen when the electronic apparatus 100 is not connected to the external apparatus or there is no input received from the external apparatus for a predetermined time. A condition for the electronic apparatus 100 to output the standby screen is not limited to the above-described example, and the standby screen may be output based on various conditions.

The electronic apparatus 100 may output the standby screen in the form of a blue screen. However, the disclosure is not limited thereto. For example, the electronic apparatus 100 may obtain an atypical object by extracting only the shape of a specific object from the data received from the external apparatus, and output the standby screen including the obtained atypical object.

Figure 3A:
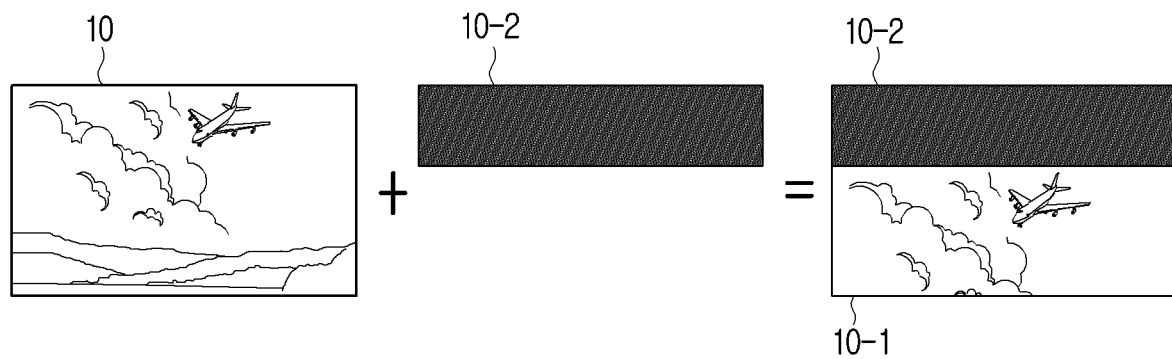
FIG. 3A is a view showing an example in which a first image is projected to a partial region of a region in which a screen is exposed, according to an embodiment of the disclosure.
Figure 3B:
FIG. 3B is a view showing another example in which the first image is projected to the partial region of the region in which the screen is exposed, according to an embodiment of the disclosure.

FIG. 3A is a view showing an example in which the first image is projected to the partial region of the region in which the screen is exposed, according to an embodiment of the disclosure; and FIG. 3B is a view showing another example in which the first image is projected to the partial region of the region in which the screen is exposed, according to an embodiment of the disclosure.

According to the disclosure, the electronic apparatus 100 may project the first image to only the partial region of the region in which the screen 210 of the screen device 200 is exposed. In detail, the electronic apparatus 100 may project the first image only to the 1-1-th region 10-1, by excluding the 1-2-th region 10-2 in which the screen 210 is not exposed, from the entire region 10 to which the electronic apparatus 100 may project the image.

Referring to FIG. 3A, the electronic apparatus 100 may control a monochrome image such as black and white to be projected in the 1-2-th region 10-2 in which the screen 210 is not exposed, and the first image to be projected in the 1-1-th region 10-1 in which the screen 210 is exposed, in the entire region 10. In an embodiment, when the 1-1-th region 10-1 in which the screen 210 is exposed has an increased size as the screen 210 is unrolled, the electronic apparatus 100 may also change a size of the first image projected to the 1-1-th region 10-1 in which the screen 210 is exposed and then project the first image. For example, when the 1-1-th region 10-1 in which the screen 210 is exposed has the increased size, the electronic apparatus 100 may project the first image to have the same effect as the image climbing up from the bottom as shown in FIG. 3A.

Referring to FIG. 3B, the electronic apparatus 100 may control the image not to be projected to the 1-2-th region 10-2 in which the screen 210 is not exposed, and the first image to be projected to the 1-1-th region 10-1 in which the screen 210 is exposed, in the entire region 10. In an embodiment, when the 1-1-th region 10-1 in which the screen 210 is exposed has the increased size as the screen 210 is unrolled, the electronic apparatus 100 may change a size of the projected image so that a region of the projected image is increased based on the 1-1-th region 10-1 in which the screen 210 is exposed.

Figure 4:
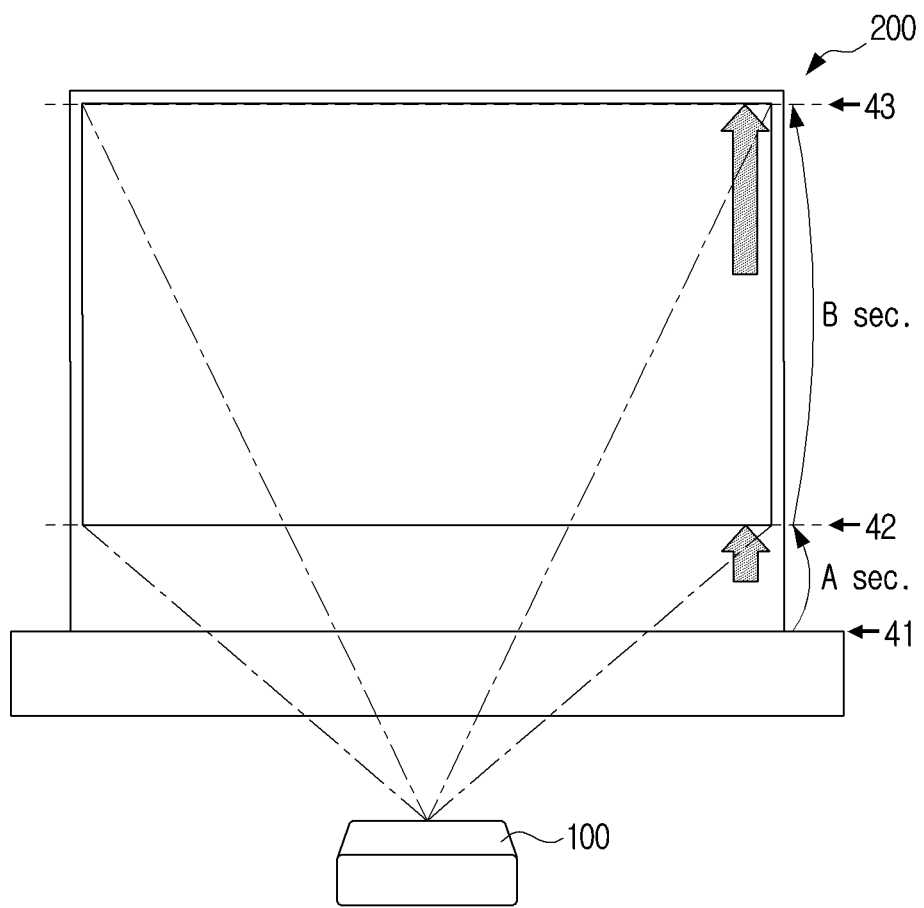
FIG. 4 is a view showing an example in which the electronic apparatus controls the projected first image as the screen is unrolled, according to an embodiment of the disclosure.

FIG. 4 is a view showing an example in which the electronic apparatus controls the projected first image as the screen is unrolled, according to an embodiment of the disclosure.

The electronic apparatus 100 may obtain screen information of the screen device 200. As described above, the screen information may include the information on the size of the screen 210, the first screen information on the speed at which the screen 210 is unfolded as the screen 210 of the screen device 200 is unrolled, and the second screen information on the speed at which the screen 210 is folded as the screen 210 is rolled.

In addition, the electronic apparatus 100 may obtain the information on the first time at which the upper end of the screen 210 reaches the minimum height of the image projected by the electronic device 100 and the information on the second time at which the screen reaches its maximum height when the screen 210 is unrolled based on the first screen information.

In addition, when receiving the user command to project the image, the electronic apparatus 100 may transmit the first operation information instructing the screen device 200 to unroll the screen to the screen device 200. In addition, the electronic apparatus 100 may project the first image to the region in which the screen is exposed when the first time elapses after the screen device 200 starts to unroll the screen 210, based on the first operation information. Here, the first time may be time at which the upper end of the screen 210 reaches the minimum height of the image projected by the electronic device 100. That is, as shown in FIG. 4, the first time may be an "A" second, and the electronic apparatus 100 may project the first image to the region in which an upper portion of the screen 210 is exposed from a point 42 at which the upper end of the screen 210 is positioned after the "A" second elapses from the time point when the screen device 200 starts to unroll the screen.

In addition, the electronic apparatus 100 may project the content image when the screen device 200 completes the unrolling of the screen, based on the screen information. The electronic apparatus 100 may project the first image from the time point when the screen device 200 starts the operation of unrolling the screen until after the second time. As shown in FIG. 4, the second time may be a sum of the "A" second and a "B" second, and the electronic apparatus 100 may project the first image to the region in which the upper portion of the screen 210 is exposed from the point 42 for the "B" second after the "A" second from the time point when the screen device 200 starts to unroll the screen. That is, the electronic apparatus 100 may project the first image as having the increased size from the point 42 to a point 43 for the "B" second as the screen 210 is unrolled.

FIG. 5 is a flowchart showing the electronic apparatus interoperating with the screen device, according to the disclosure.

Referring to FIG. 5, an electronic apparatus 100 may obtain screen information of a screen device 200 (S510). Next, the electronic apparatus 100 may transmit first operation information to the screen device 200 (S520). For example, the electronic apparatus 100 may transmit the first operation information to the screen device 200 when receiving a user command to project an image. According to the disclosure, the user command to project the image may be a user command to turn on power of the electronic apparatus 100 or a user command to project the image by using the electronic apparatus 100.

In addition, the screen device 200 may unroll a screen 210, based on the first operation information (S530). That is, the screen device 200 may unroll the screen to unfold the screen 210 when receiving the first operation information. In addition, the electronic apparatus 100 may project a first image to at least a partial region of a region in which the screen is exposed based on the screen information while the screen 210 of the screen device 200 is unrolled (S540). Here, the first image may be a welcome image provided while the screen 210 is unrolled. According to the disclosure, a size of the welcome image may be changed based on a size of the region in which the screen 210 is exposed.

In addition, the electronic apparatus 100 may project a content image when the screen device 200 completes the unrolling of the screen, based on the screen information (S550). The content image according to the disclosure may be an image provided by the electronic apparatus 100 or an image provided by an external apparatus connected to the electronic apparatus 100, and may be an image that a user wants to view.

Next, the electronic apparatus 100 may transmit second operation information to the screen device 200 (S560). For example, the electronic apparatus 100 may transmit the second operation information instructing the screen device 200 to roll the screen to the screen device 200 when receiving a user command not to project the image. According to the disclosure, the user command not to project the image may be a user command to turn off the power of the electronic apparatus 100 or a user command not to project the image.

Next, the screen device 200 may roll the screen 210, based on the second operation information (S570). That is, the screen device 200 may roll the screen to fold the screen 210 when receiving the second operation information. In addition, while the screen 210 of the screen device 200 is rolled, the electronic apparatus 100 may project a second image to the at least partial region of the region in which the screen is exposed based on the screen information (S580). Here, the second image may be a farewell image provided while the screen 210 is rolled. According to the disclosure, a size of the farewell image may be changed based on the size of the region in which the screen 210 is exposed.

FIG. 6 is a flowchart showing an example in which an external apparatus controls the electronic apparatus and the screen device, according to an embodiment of the disclosure.

The operations of the electronic apparatus 100 and the screen device 200 may be controlled by an external apparatus 300 which may control the electronic apparatus 100 and the screen device 200. For example, the external apparatus 300 may be implemented as a remote control capable of performing a master boot record (MBR) function, or may be implemented as a user terminal apparatus capable of communicating with the electronic apparatus 100 and the screen device 200.

Referring to FIG. 6, the electronic apparatus 100 may obtain screen information of the screen device 200 (S605). For example, the electronic apparatus 100 may obtain screen information corresponding to the screen device 200 among information on the plurality of screen devices pre-stored in the electronic apparatus 100 or an external server, based on the manufacturer and product name of the screen device 200.

Next, the external apparatus 300 may transmit a power-on signal to the electronic apparatus 100 (S610). For example, the external apparatus 300 may transmit the power-on signal to the electronic apparatus 100 when receiving the user command to turn on the power of the electronic apparatus 100 from the external apparatus 300. For example, the external apparatus 300 may transmit the power-on signal to the electronic apparatus 100 by using a first communication method (e.g., Bluetooth method). The electronic apparatus 100 may transmit the first operation information to the external apparatus 300 when receiving the power-on signal (S615). For example, the electronic apparatus 100 may transmit the first operation information to the external apparatus 300 by using the first communication method (e.g., Bluetooth method). Here, the first operation information may include a control instruction to unroll the screen 210.

The external apparatus 300 may transmit the first operation information to the screen device 200 when receiving the first operation information (S620). For example, the external apparatus 300 may transmit the first operation information to the screen device 200 by using a second communication method (e.g., infrared ray (IR) communication method). The screen device 200 may unroll the screen, based on the first operation information when receiving the first operation information (S625).

In addition, while the screen device 200 performs the operation of unrolling the screen, the electronic apparatus 100 may project the first image to a region corresponding to the screen of the screen device, based on the screen information (S630). In addition, the electronic apparatus 100 may project the content image when the screen device 200 completes the unrolling of the screen, based on the screen information (S635).

Next, the external apparatus 300 may transmit a power-off signal to the electronic apparatus 100 (S640). For example, when receiving the user command to turn off the power of the electronic apparatus 100, the external apparatus 300 may transmit the power-off signal to the electronic apparatus 100. For example, the external apparatus 300 may transmit the power-off signal to the electronic apparatus 100 by using the first communication method (e.g., Bluetooth method). The electronic apparatus 100 may transmit the second operation information to the external apparatus 300 when receiving the power-off signal (S645). For example, the electronic apparatus 100 may transmit the second operation information to the external apparatus 300 by using the first communication method (e.g., Bluetooth method). Here, the second operation information may include a control instruction to roll the screen 210.

The external apparatus 300 may transmit the second operation information to the screen device 200 when receiving the second operation information (S650). For example, the external apparatus 300 may transmit the second operation information to the screen device 200 by using the second communication method (e.g., IR communication method). The screen device 200 may roll the screen, based on the second operation information when receiving the second operation information (S655).

In addition, while the screen device 200 performs the operation of rolling the screen, the electronic apparatus 100 may project the second image to the region corresponding to the screen of the screen device, based on the screen information (S660).

Figure 7A:
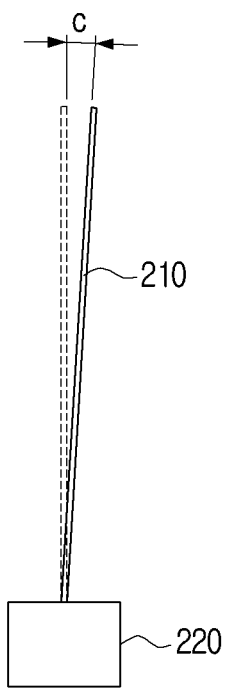
FIG. 7A is a view showing that the screen is moved as the screen device unrolls the screen, according to an embodiment of the disclosure.

FIG. 7A is a view showing that the screen is moved as the screen device unrolls the screen, according to an embodiment of the disclosure.

In an embodiment of the disclosure, the electronic apparatus 100 may be implemented as an ultra-short throw projector apparatus, and the screen device 200 and the electronic apparatus 100 may thus be required to be placed close to each other. In this case, while the screen 210 is moved to be unrolled from or rolled into a main body 220, a minute distance difference "c" between the screen 210 and the electronic apparatus 100 may greatly change a size of the image projected to the screen. For example, in case of the ultra-short throw projector apparatus having a through ratio of 0.189, if the distance "c" between the screen 210 and the electronic apparatus 100 is changed by 5 mm, a horizontal size of the image projected to the screen may be changed by 26.5 mm. The electronic apparatus 100 according to the disclosure may thus obtain motion information of the screen 210 of the screen device 200, and may correct and project the first image and the second image.

Figure 7B:
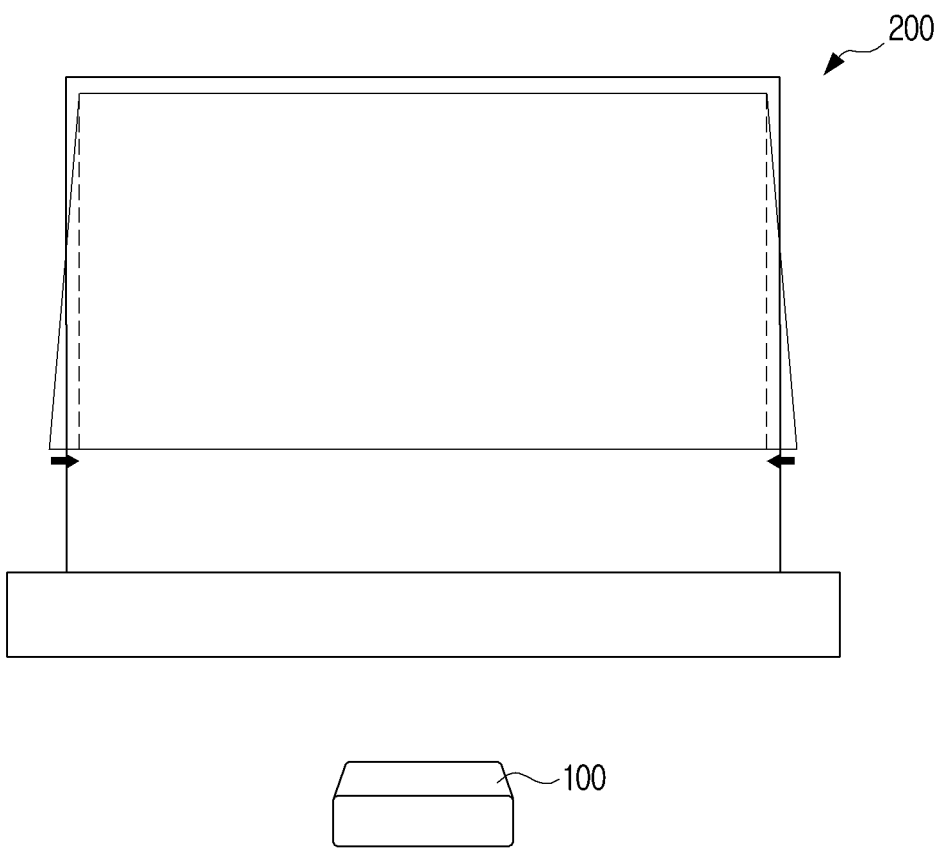
FIG. 7B is a view showing an example in which a keystone correction is performed based on motion information of the screen device, according to an embodiment of the disclosure.

FIG. 7B is a view showing an example in which the keystone correction is performed based on the motion information of the screen device, according to an embodiment of the disclosure.

In an embodiment of the disclosure, the electronic apparatus 100 may perform the keystone correction on the first image and the second image, based on the motion information of the screen device 200. FIG. 7B shows a case in which the upper end of the screen 210 becomes closer to the electronic apparatus 100 due to the motion of the screen 210 occurring while the screen 210 is moved to be unrolled or rolled. In this case, a lower end of the screen 210 may be relatively farther away from the electronic apparatus 100 than the upper end, when compared to a general case, and a horizontal size of the image projected to the lower end may thus become longer than a horizontal length of the image projected to the upper end. The electronic apparatus 100 may thus project the image by performing the keystone correction that reduces a horizontal length of the image projected to the lower end of the screen 210 as shown in FIG. 7B.

Figure 7C:
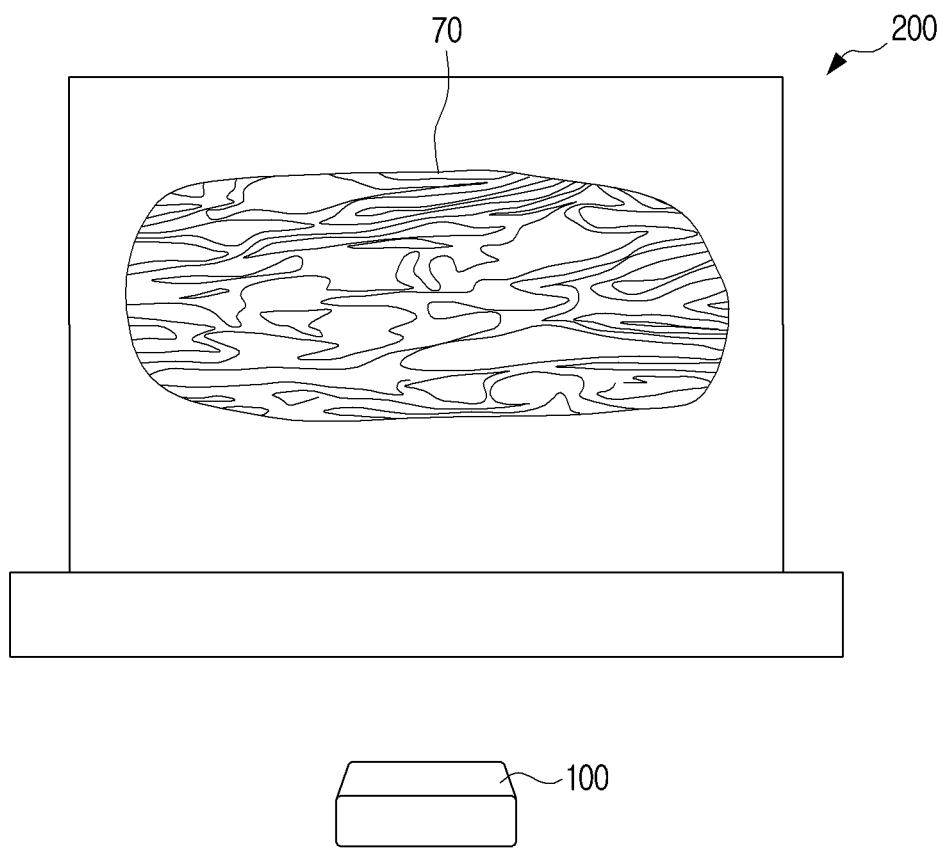
FIG. 7C is a view showing an example in which a third image is projected based on the motion information of the screen device, according to an embodiment of the disclosure.

FIG. 7C is a view showing an example in which a third image is projected based on the motion information of the screen device, according to an embodiment of the disclosure.

In an embodiment of the disclosure, the electronic apparatus 100 may project a third image 70 when the motion information indicates that the motion of the screen 210 has a value greater than or equal to the predetermined value while the screen 210 is unrolled.

In an embodiment of the disclosure, if the screen 210 has the large motion, there may be a limitation in performing the keystone correction thereon. In this case, the electronic apparatus 100 may project the third image 70 which is the image projected only to the partial region of the screen 210.

According to an embodiment of the disclosure, the third image may be the image projected to a reduced region than that of the existing first image.

In an embodiment of the disclosure, the third image may be the image for minimizing the motion sickness of the user, such as a wave pattern image.

In an embodiment of the disclosure, the third image may be a blurred image of the first image projected to the screen 210.

Figure 8A:
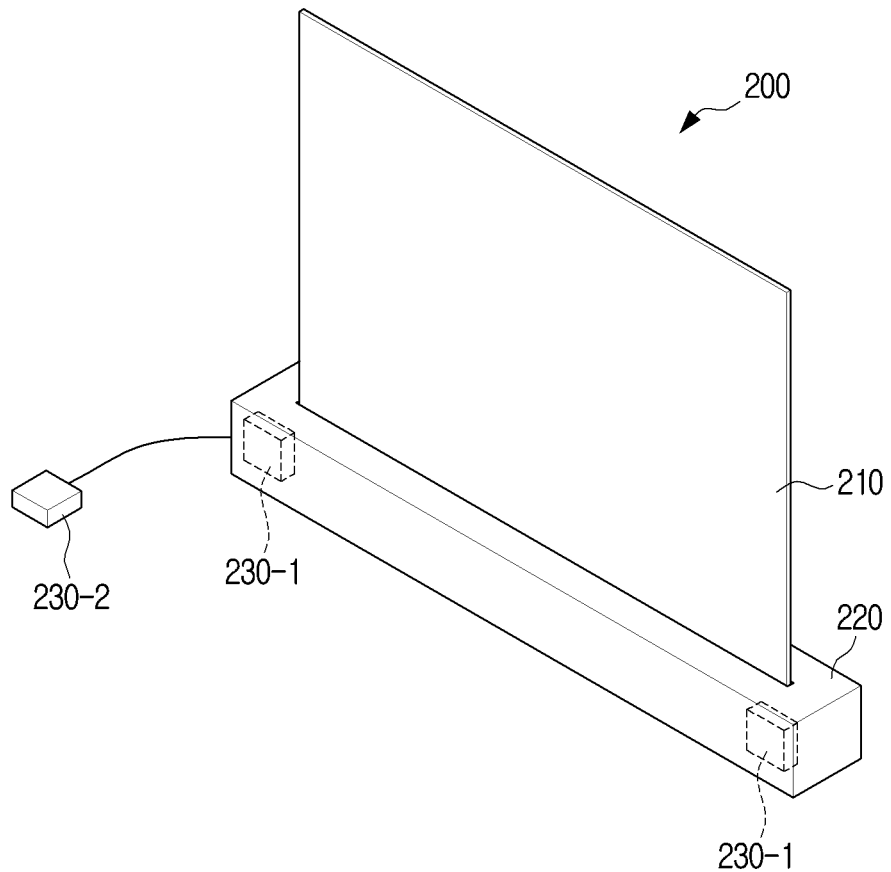
FIG. 8A is a view showing a sensor of the screen device, according to an embodiment of the disclosure.

FIG. 8A is a view showing a sensor of the screen device, according to an embodiment of the disclosure.

In an embodiment of the disclosure, the screen device 200 may be implemented to transmit the state information to the electronic apparatus 100. For example, the screen device 200 may include a plurality of sensors 230-1 and 230-2 to transmit the state information by using the IR communication method as shown in FIG. 8A. The plurality of sensors 230-1 and 230-2 may include the plurality of first sensors 230-1 disposed inside the main body 220 of the screen device 200 and the second sensor 230-2 disposed outside the main body 220. Here, the plurality of sensors 230-1 and 230-2 may include an IR transmit frequency (Tx) for transmitting the state information of the screen device 200 to the electronic apparatus 100 and an IR receive frequency (Rx) for receiving operation information of the screen device 200 from the electronic apparatus 100. In addition, the screen device 200 may perform an IR key data mapping to define data on the state information of the screen device 200, delivered to the electronic apparatus 100, and may transmit the defined data to the electronic apparatus 100 through the IR Tx. For example, the screen device 200 may transmit, to the electronic apparatus 100, the state information indicating that the screen device 200 is turned on, the screen device 200 is turned off, the screen 210 is unrolled, the screen 210 is rolled, the screen device 200 is unable to unroll the screen or the screen device 200 is unable to roll the screen.

Figure 8B:
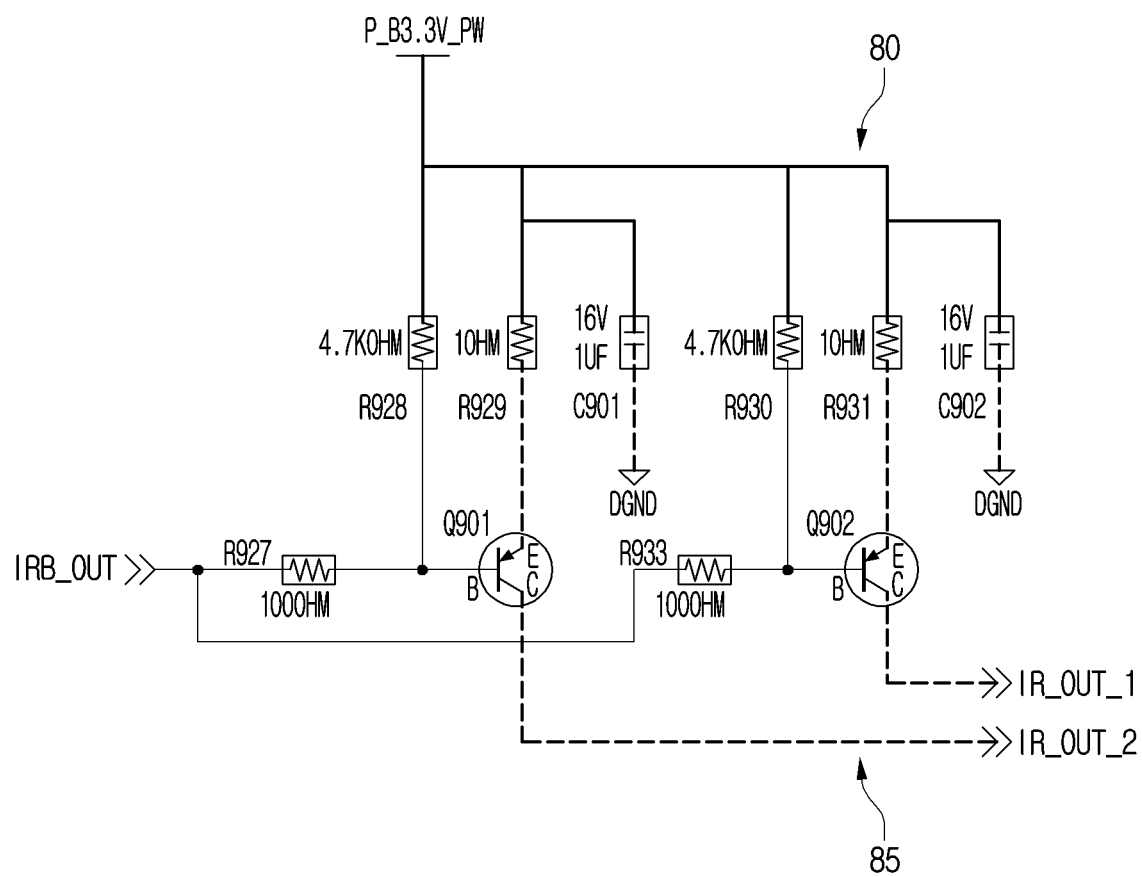
FIG. 8B is a view showing a configuration of the sensor of the screen device, according to an embodiment of the disclosure.

FIG. 8B is a view showing a configuration of the sensor of the screen device, according to an embodiment of the disclosure.

In an embodiment of the disclosure, the plurality of sensors 230-1 and 230-2 may be implemented as an IR transmitter as shown in FIG. 8B. The plurality of sensors 230-1 and 230-2 shown in FIG. 8B may be implemented as a solid line 80 and a dotted line 85, which are shown relatively thick (e.g., 0.5 mm). In addition, the line 80 of the plurality of sensors 230-1 and 230-2 and a power plane of 3.3 V may be disposed adjacent to each other.

Figure 9:
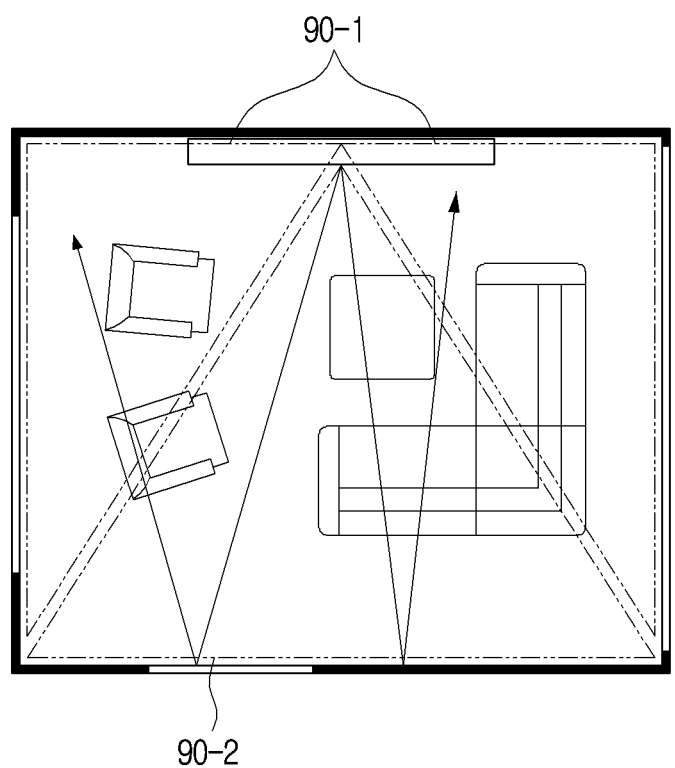
FIG. 9 is a view showing a coverage region of an infrared ray (IR) sensor radiated from the screen device, according to an embodiment of the disclosure.
Figure 10:
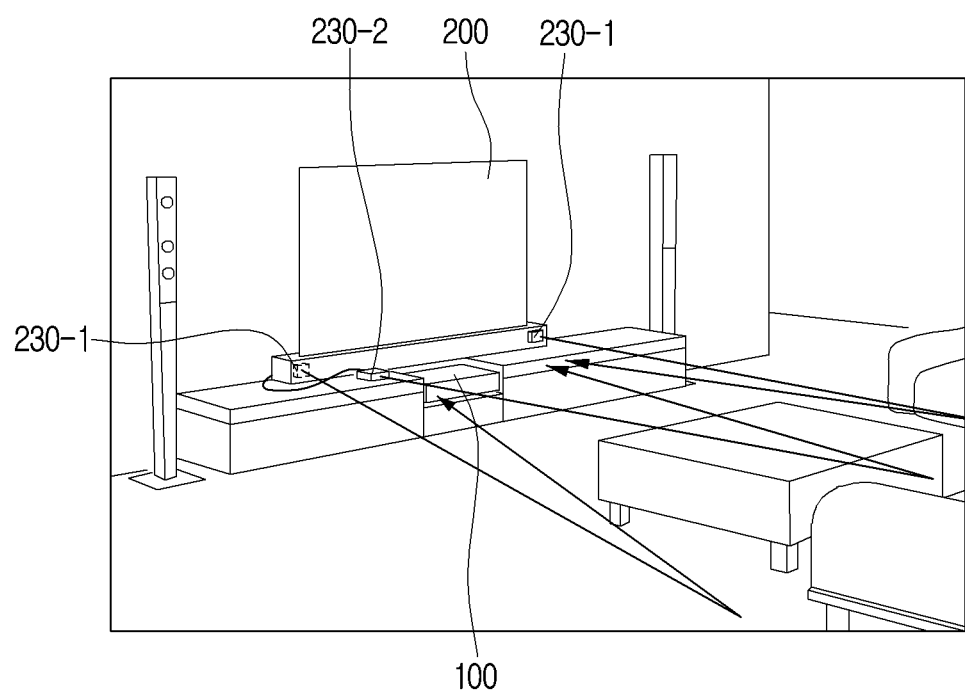
FIG. 10 is a view showing state information of the screen device, transmitted from the screen device, according to an embodiment of the disclosure.

FIG. 9 is a view showing a coverage region of an IR sensor radiated from the screen device, according to an embodiment of the disclosure; and FIG. 10 is a view showing the state information of the screen device, transmitted from the screen device, according to an embodiment of the disclosure.

In an embodiment of the disclosure, the screen device 200 may transmit the state information to the electronic apparatus 100 by using the IR communication method. In this case, the screen device 200 may radiate the state information based on the plurality of sensors 230-1 and 230-2 as shown in FIG. 8A, thereby securing an IR coverage in an entire region of an environment in which the screen device 200 is installed.

That is, when referring to FIG. 9, a region 90-2 may be a region where a signal radiated from the IR sensor directly reaches, and a region 90-1 may be a region where the IR signal radiated from the IR sensor may reach by being reflected by an object, a wall, etc. That is, the screen device 200 may use the plurality of sensors 230-1 and 230-2 as shown in FIG. 8A, may use the reflection of the IR signal radiated from the IR sensor to transmit the state information to apparatuses positioned in the entire region of the environment in which the screen device 200 is installed.

In addition, even when the electronic apparatus 100 is embedded and installed as shown in FIG. 10, the electronic apparatus 100 may receive the IR signal of the screen device 200 by the reflection of the IR signal as shown in FIG. 9. That is, the IR signal may be radiated from each of the plurality of sensors 230-1 and 230-2 of the screen device 200, the radiated IR signal may be reflected on the wall, the object or the like in the environment in which the screen device 200 is installed, and the reflected IR signal may then reach the electronic apparatus 100.

Figure 11:
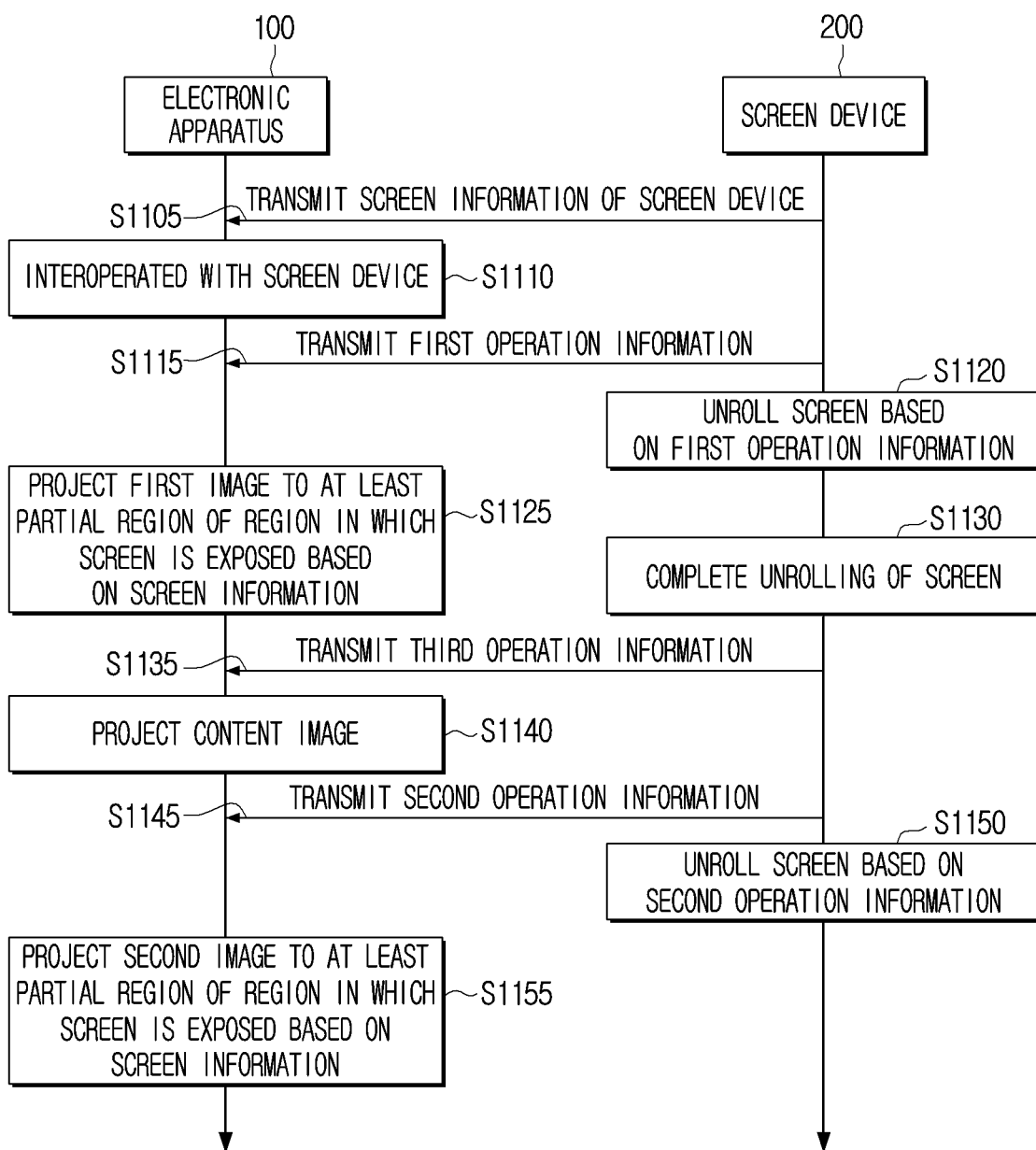
FIG. 11 is a sequence view showing the screen device interoperating with the electronic apparatus to transmit the state information, according to an embodiment of the disclosure.

FIG. 11 is a sequence view showing the screen device interoperating with the electronic apparatus to transmit the state information, according to the disclosure.

Referring to FIG. 11, the screen device 200 may transmit the screen information of the screen device 200 to the electronic apparatus 100 (S1105). For example, the screen information may include the information on the size of the screen 210, the first screen information on the speed at which the screen 210 is unfolded as the screen 210 of the screen device 200 is unrolled, and the second screen information on the speed at which the screen 210 is folded as the screen 210 is rolled. However, the disclosure is not limited thereto. The electronic apparatus 100 may obtain the screen information corresponding to the screen device 200 among information on the plurality of screen devices pre-stored in the electronic apparatus 100 or the external server, based on the manufacturer and product name of the screen device 200.

Next, the electronic apparatus 100 may interoperate with the screen device 200 (S1110). In an embodiment, the electronic apparatus 100 may obtain the information on the first time at which the upper end of the screen 210 reaches a minimum height of the image projected by the electronic device 100 and the information on the second time at which the screen reaches its maximum height when the screen 210 is unrolled based on the first screen information. In addition, the electronic apparatus 100 may also obtain the information on the third time at which the upper end of the screen 210 reaches the minimum height of the image projected by the electronic device 100 when the screen 210 is rolled based on the second screen information.

Next, the screen device 200 may transmit the first operation information to the electronic apparatus 100 (S1115). The first operation information of FIG. 11 may be the state information indicating that the screen device 200 performs the operation of unrolling the screen 210. Next, the screen device 200 may unroll the screen 210 based on the first operation information (S1120).

The electronic apparatus 100 may project the first image to the at least partial region of the region in which the screen 210 is exposed based on the screen information when receiving the first operation information (S1125).

Next, the screen device 200 may complete the unrolling of the screen (S1130). The screen device 200 may transmit the third operation information to the electronic apparatus 100 when completing the unrolling of the screen. The third operation information of FIG. 11 may be the state information indicating that the screen device 200 completes the unrolling of the screen 210. In addition, the electronic apparatus 100 may project the content image when receiving the third operation information.

Next, the screen device 200 may transmit the second operation information to the electronic apparatus 100. The second operation information of FIG. 11 may be the state information indicating that the screen device 200 performs the operation of rolling the screen 210. The electronic apparatus 100 may project the second image to the at least partial region of the region in which the screen 210 is exposed based on the screen information when receiving the second operation information.

Figure 12:
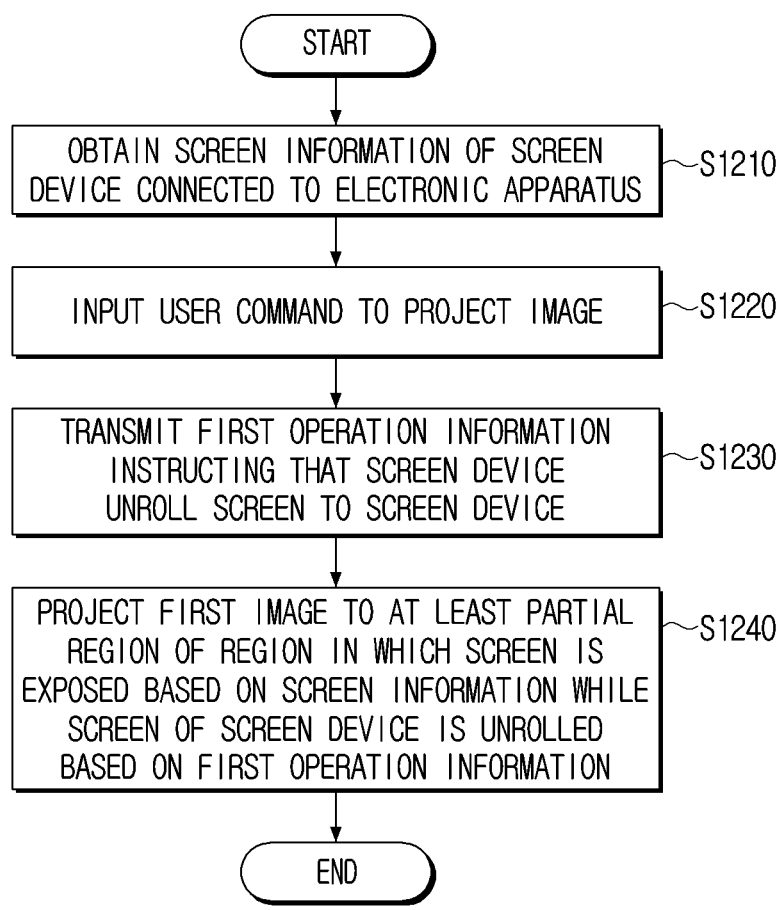
FIG. 12 is a flowchart showing the operation of the electronic apparatus according to an embodiment of the disclosure.

FIG. 12 is a flowchart showing the operation of the electronic apparatus according to the disclosure.

Referring to FIG. 12, the electronic apparatus 100 may obtain the screen information of the screen device 200 connected to the electronic apparatus 100 (S1210).

In addition, the electronic apparatus 100 may receive the user command to project the image (S1220). According to the disclosure, the user command to project the image may be a user command to turn on the power of the electronic apparatus 100 or a user command to project the image by using the electronic apparatus 100. In addition, the electronic apparatus 100 may receive the user command to project the image from the external apparatus that may control the electronic apparatus 100, or may receive the user command to project the image through the physical button included in the electronic apparatus 100.

The electronic apparatus 100 may transmit the first operation information instructing that the screen device 200 unroll the screen to the screen device 200 when receiving the user command to project the image (S1230). The screen device 200 may then unroll the screen 210 when receiving the first operation information.

In addition, the electronic apparatus 100 may project the first image to the at least partial region of the region in which the screen 210 is exposed based on the screen information while the screen 210 of the screen device 200 is unrolled based on the first operation information (S1240).

In an embodiment of the disclosure, the electronic apparatus 100 may obtain the motion information of the screen device while the screen 210 of the screen device 200 is unrolled based on the first operation information. For example, the electronic apparatus 100 may obtain the motion information based on the information on the distance between the upper end of the screen 210 and the electronic apparatus 100. For example, the electronic apparatus 100 may obtain the motion information by obtaining the vibration information of the screen 210 by using the vibration sensor attached to the screen device 200. In addition, the electronic apparatus 100 may correct the first image based on the motion information and project the corrected first image.

Figure 13:
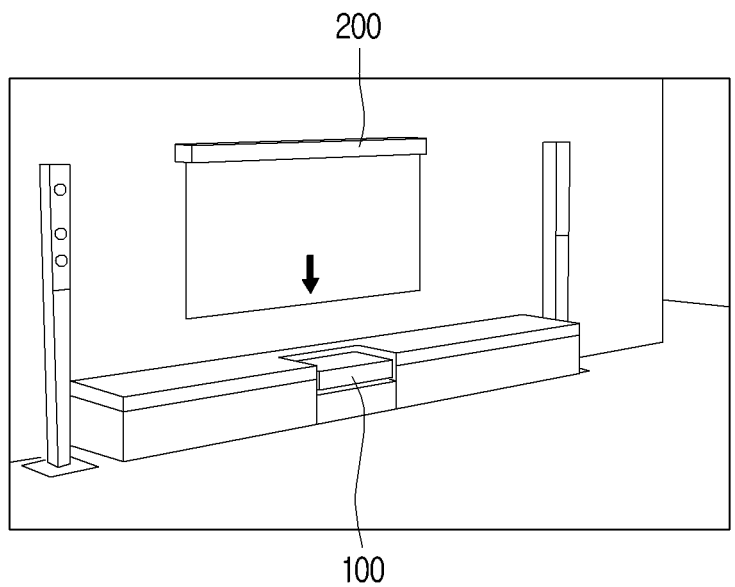
FIG. 13 is a view showing an electronic apparatus and a screen device, according to an embodiment of the disclosure.

FIG. 13 is a view showing an electronic apparatus and a screen device, according to an embodiment of the disclosure.

The above-described examples show that the screen 210 of the screen device 200 is unfolded by rising and being unrolled from the screen device 200 installed on the floor or the like, and the disclosure is not limited thereto.

That is, referring to FIG. 13, the screen device 200 may be installed on the ceiling, the wall or the like, and the screen 210 may be unfolded by going down and being unrolled from the screen device 200 installed on the ceiling, the wall or the like.

Figure 14:
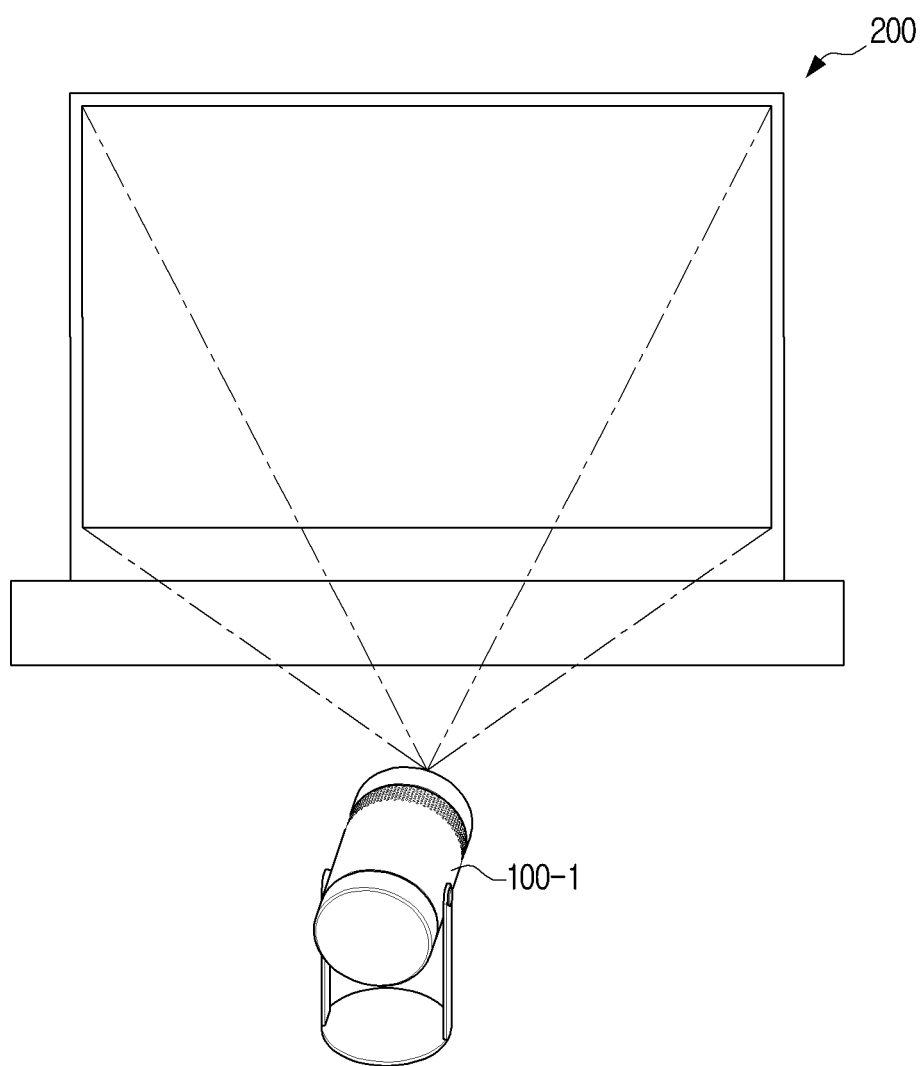
FIG. 14 is a view showing an electronic apparatus and a screen device, according to an embodiment of the disclosure.

FIG. 14 is a view showing an electronic apparatus and a screen device, according to an embodiment of the disclosure.

The examples described above show that the electronic apparatus 100 is fixed to a specific position and projects the projected image to the screen device 200.

That is, an electronic apparatus 100-1 as shown in FIG. 14 may be implemented as a portable electronic apparatus that may be movable and projects the projected image. For example, the electronic apparatus 100-1 may be the home or industrial projector apparatus, may be the lighting apparatus used in daily life, and may be the audio apparatus including the audio module. Meanwhile, the electronic apparatus 100-1 according to an embodiment of the disclosure is not limited to the above-described apparatuses, and may be implemented as the electronic apparatus 100-1 having two or more functions of the above-described apparatuses. For example, the electronic apparatus 100-1 may be used as the display apparatus, the lighting apparatus or the audio apparatus by turning off its projector function and turning on the lighting function or the speaker function, or may be used as the artificial intelligence (AI) speaker including the microphone or the communication apparatus, based on the operation of the processor.

In detail, the electronic apparatus 100-1 may include the TOF sensor for detecting a surface of the screen, to which the projected image is projected, and may obtain information on a distance between the screen 210 of the screen device 200 and the electronic apparatus 100-1 by using the TOF sensor.

In addition, the electronic apparatus 100-1 may control the first image to be projected to the at least partial region of the region in which the screen 210 is exposed by using the screen information and distance information of the screen device 200 while the screen 210 of the screen device 200 is unrolled.

In addition, the electronic apparatus 100-1 may control the second image to be projected to the at least partial region of the region in which the screen 210 is exposed by using the screen information and distance information of the screen device 200 while the screen 210 of the screen device 200 is rolled.

Figure 15:
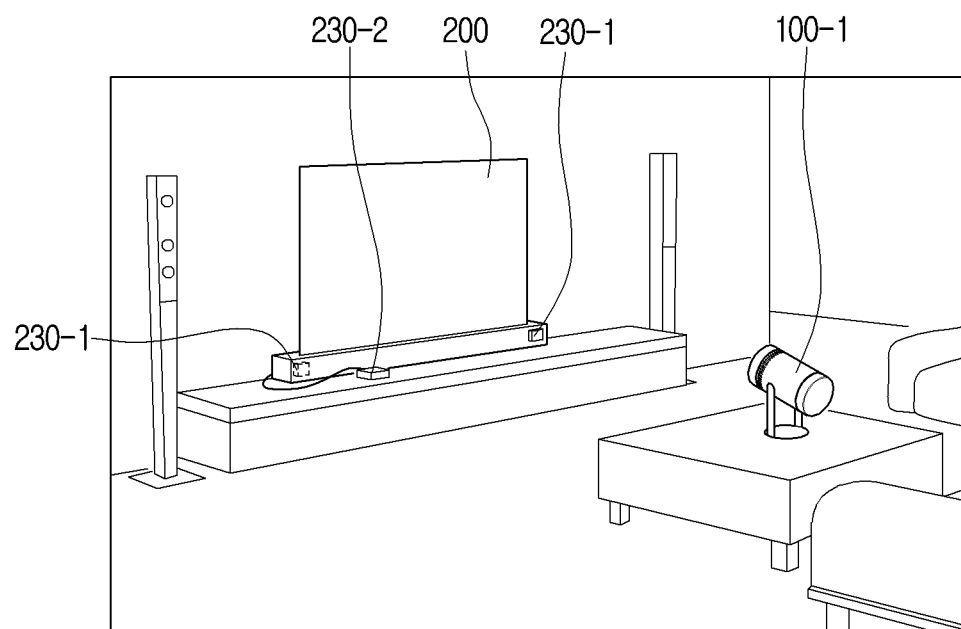
FIG. 15 is a view showing an example in which the electronic apparatus receives the state information transmitted from the screen device, according to an embodiment of the disclosure.

FIG. 15 is a view showing an example in which the electronic apparatus receives the state information transmitted from the screen device, according to an embodiment of the disclosure.

In an embodiment of the disclosure, the screen device 200 may transmit the state information to the electronic apparatus 100-1 by using the IR communication method. In this case, the screen device 200 may radiate the state information by using the plurality of sensors 230-1 and 230-2 as shown in FIG. 15, thereby securing the IR coverage in the entire region of the environment in which the screen device 200 is installed.

That is, as described with reference to FIG. 9, the state information radiated from the plurality of sensors 230-1 and 230-2 may be directly transmitted to the electronic apparatus 100-1, or may be reflected by the object, the wall or the like and then transmitted to the electronic apparatus 100-1. In this manner, the state information may be transmitted to the apparatuses positioned in the entire region of the environment in which the screen device 200 is installed.

The disclosure may be diversely modified and have various embodiments, and the example embodiments of the disclosure are thus shown in the drawings and described in detail in the detailed description. However, it is to be understood that the technology mentioned in the disclosure is not limited to the example embodiments, and includes various modifications, equivalents, and/or alternatives according to the embodiments of the disclosure. Throughout the accompanying drawings, similar components are denoted by similar reference numerals.

In describing the disclosure, if it is decided that a detailed description for the known functions or configurations related to the disclosure may unnecessarily obscure the gist of the disclosure, the detailed description thereof is omitted.

In addition, the embodiments described above may be modified in several different forms, and the scope and spirit of the disclosure are not limited to the embodiments. Rather, these embodiments are provided to make the disclosure thorough and complete, and to completely transfer the spirit of the disclosure to those skilled in the art.

Terms used in the disclosure are used only to describe the example embodiments rather than limiting the scope of the disclosure. Singular forms used herein are intended to include plural forms unless explicitly indicated otherwise.

In the disclosure, the expression "have," "may have," "include," "may include" or the like, indicates existence of a corresponding feature (for example, a numerical value, a function, an operation or a component such as a part), and does not exclude existence of an additional feature.

In the disclosure, the expression "A or B," "at least one of A and/or B" or "one or more of A and/or B" or the like, may include all possible combinations of items enumerated together. For example, the scope of the expression or phrase "A and/or B" includes all of the following: (1) the item "A", (2) the item "B", and (3) the combination of items "A and B". For example, the scope of the expressions or phrases "A or B," "at least one of A and B," or "at least one of A or B" includes all of: 1) a case in which at least one A is included, 2) a case in which at least one B is included, and 3) a case in which both of at least one A and at least one B are included.

The expressions "first," "second" and the like, used in the disclosure may indicate various components regardless of a sequence and/or importance of the components. These expressions are only used in order to distinguish one component from the other components, and do not limit the corresponding components.

If any component (for example, a first component) is mentioned to be (operatively or communicatively) coupled with/to or connected to another component (for example, a second component), it is to be understood that the any component is directly coupled to the another component or may be coupled to the another component through another component (for example, a third component).

On the other hand, if it is mentioned that any component (for example, the first component) is "directly coupled" or "directly connected" to another component (for example, the second component), it is to be understood that the other component (for example, the third component) is not present between any component and the another component.

An expression "configured (or set) to" used in the disclosure may be replaced by an expression "suitable for," "having the capacity to," "designed to," "adapted to," "made to" or "capable of" based on a situation. A term "configured (or set) to" may not necessarily indicate "specifically designed to" in hardware.

Instead, an expression "an apparatus configured to" may indicate that the apparatus may "perform~" together with other apparatuses or components. For example, "a processor configured (or set) to perform A, B and C" may indicate a dedicated processor (for example, an embedded processor) for performing the corresponding operations or a generic-purpose processor (for example, a central processing unit (CPU) or an application processor) that may perform the corresponding operations by executing one or more software programs stored in a memory apparatus.

In the embodiments, a "module" or like term may perform at least one function or operation, and be implemented by hardware or software or be implemented by a combination of hardware and software. In addition, a plurality of "modules" may be integrated in at least one module and be implemented by at least one processor except for a "module" that needs to be implemented by specific hardware.

Meanwhile, the various elements and regions in the drawings are schematically shown. Therefore, the spirit of the disclosure is not limited by relative sizes or intervals shown in the accompanying drawings.

Meanwhile, the various embodiments of the disclosure described above may be implemented in a computer or a computer readable recording medium using software, hardware or a combination of software and hardware. According to a hardware implementation, the embodiments described in the disclosure may be implemented using at least one of an application specific integrated circuit (ASIC), a digital signal processor (DSP), a digital signal processing device (DSPD), a programmable logic device (PLD), a field programmable gate array (FPGA), a processor, a controller, a micro-controller, a microprocessor or an electric unit for performing another function. In some cases, the embodiments described in disclosure may be implemented by the processor itself. According to a software implementation, the embodiments such as procedures and functions described in the disclosure may be implemented by separate software modules. Each of the software modules may perform one or more functions and operations described in the disclosure.

Meanwhile, one or more aspects of the methods according to the various embodiments of the disclosure described above may be stored as a program or as instructions in a non-transitory readable medium. The non-transitory readable medium may be mounted and used in various apparatuses.

The non-transitory readable medium is not a medium that temporarily stores data therein, such as a register, a cache, a memory or the like, and indicates a medium that semi-permanently stores data therein and is readable by an apparatus. In detail, programs for performing the various methods described above may be stored and provided in the non-transitory readable medium such as a compact disc (CD), a digital versatile disc (DVD), a hard disc, a blue-ray disc, a universal serial bus (USB), a memory card, a read only memory (ROM) or the like.

According to an embodiment, the methods according to the various embodiments disclosed in the disclosure may be included and provided in a computer program product. The computer program product may be traded as a product between a seller and a purchaser. The computer program product may be distributed in the form of a storage medium (for example, a compact disc read only memory (CD-ROM)) that may be read by the machine or online through an application store (for example, PlayStore™). In case of the online distribution, at least portions of the computer program product may be at least temporarily stored in a storage medium such as a memory of a server of a manufacturer, a server of an application store, or a relay server or be temporarily created.

In addition, although the embodiments are shown and described in the disclosure as above, the disclosure is not limited to the above mentioned example embodiments, and may be variously modified by those skilled in the art to which the disclosure pertains without departing from the gist of the disclosure as disclosed in the accompanying claims. These modifications should also be understood to fall within the scope and spirit of the disclosure.

What is claimed is:

1. An electronic apparatus, comprising:
    a projector;
    an input/output interface;
    a memory; and
    a processor configured to control the electronic apparatus by executing at least one instruction stored in the memory to:
        obtain screen information of a screen of a screen device,
        control the input/output interface to transmit first operation information corresponding to an unrolling of the screen, in response to receiving a user command to project an image, and
        while the screen is being unrolled by the screen device based on the transmitted first operation information, control the projector, based on the obtained screen information, to project a first image to at least a partial region of a region in which the screen is exposed.

2. The electronic apparatus as claimed in claim 1, wherein the processor is configured to
    control the input/output interface to transmit second operation information corresponding to rolling of the screen device, in response to receiving a user command not to project the image, and
    while the screen is being rolled by the screen device based on the transmitted second operation information, control the projector to project, based on the obtained screen information, a second image to the at least the partial region of the region in which the screen is exposed.

3. The electronic apparatus as claimed in claim 1, wherein the processor is configured to
    obtain motion information of the screen while the screen is being unrolled by the screen device, based on the transmitted first operation information, and
    control the projector to correct the first image, based on the obtained motion information, and to project the corrected first image.

4. The electronic apparatus as claimed in claim 3, wherein the processor is configured to obtain the motion information, based on information on a distance between an upper end of the screen and the electronic apparatus while the screen is being unrolled by the screen device based on the transmitted first operation information.

5. The electronic apparatus as claimed in claim 3, wherein the processor is configured to
    obtain vibration information of the screen by using a vibration sensor while the screen is being unrolled by the screen device based on the transmitted first operation information, and
    control the projector to correct the first image, based on the vibration information, and to project the corrected first image to the at least the partial region of the region in which the screen is exposed.

6. The electronic apparatus as claimed in claim 3, wherein the processor is configured to control the projector to project a third image when the motion information has a value greater than or equal to a predetermined value.

7. The electronic apparatus as claimed in claim 1, wherein the processor is configured to, after the screen is unrolled by the screen device based on the transmitted first operation information, control the projector to project the first image to the at least the partial region of the region in which the screen is exposed after a first time elapses.

8. The electronic apparatus as claimed in claim 1, wherein the processor is configured to
    control the input/output interface to transmit the first operation information to an external apparatus controlling the electronic apparatus by using a first communication method in response to receiving power-on information of the electronic apparatus from the external apparatus, and
    control the projector to project the first image to the at least the partial region of the region in which the screen is exposed while the screen is being unrolled as the external apparatus transmits the first operation information to the screen device by using a second communication method.

9. The electronic apparatus as claimed in claim 1, wherein the processor is configured to
    control the projector to project a content image different from the first image in response to receiving, from the screen device, operation information indicating that the screen device has completed the unrolling of the screen.

10. The electronic apparatus as claimed in claim 1, wherein the processor is configured to
    control the input/output interface to receive, from the screen device, state information indicating that the screen device is unable to unroll the screen, and
    allow information indicating that the screen device is unable to unroll the screen to be provided based on the state information.

11. The electronic apparatus as claimed in claim 1, wherein the obtained screen information includes information on a speed at which the screen is unfolded as the screen is unrolled, and the processor is configured to control the projector to project the first image based on the information on the speed included in the obtained screen information.

12. A method of an electronic apparatus, the method comprising:
    obtaining screen information of a screen of a screen device;
    transmitting first operation information corresponding to an unrolling of the screen, in response to receiving a user command to project an image; and while the screen is being unrolled by the screen device based on the transmitted first operation information, projecting, based on the obtained screen information, a first image to at least a partial region of a region in which the screen is exposed.

13. The method as claimed in claim 12, further comprising:

transmitting second operation information corresponding to rolling of the screen device, in response to receiving a user command not to project the image; and while the screen is being rolled by the screen device based on the transmitted second operation information, projecting, based on the obtained screen information, a second image to the at least the partial region of the region in which the screen is exposed.

14. The method as claimed in claim 12, wherein the projecting includes:

obtaining motion information of the screen while the screen is being unrolled by the screen device, based on the transmitted first operation information, correcting the first image, based on the obtained motion information, and projecting the corrected first image.

15. The method as claimed in claim 14, wherein the obtaining of the motion information includes obtaining the motion information, based on information on a distance between an upper end of the screen and the electronic apparatus while the screen is being unrolled by the screen device, based on the transmitted first operation information.

16. The method as claimed in claim 14, further comprising:

obtaining vibration information of the screen by using a vibration sensor while the screen is being unrolled by the screen device based on the transmitted first operation information;

correcting the first image, based on the vibration information; and projecting the corrected first image to the at least the partial region of the region in which the screen is exposed.

17. The method as claimed in claim 12, wherein the obtained screen information includes information on a speed at which the screen is unfolded as the screen is unrolled, and the projecting projects the first image based on the information on the speed included in the obtained screen information.

18. An electronic apparatus, comprising:

a projector; and a processor configured to control the electronic apparatus to:

obtain screen information indicating a speed at which a screen of a screen device is unfolded as the screen is unrolled by the screen device, transmit information instructing the screen device to unroll the screen, in response to receiving a user command to project an image, and while the screen is being unrolled by the screen device based on the transmitted information, control the projector, based on the speed indicated by the obtained screen information, to project an image to at least a partial region of a region in which the screen is exposed.

* * * * *

UNITED STATES PATENT AND TRADEMARK OFFICE
CERTIFICATE OF CORRECTION

| | |
|---|---|
| PATENT NO. | : 11,822,225 B2 |
| APPLICATION NO. | : 17/586408 |
| DATED | : November 21, 2023 |
| INVENTOR(S) | : Seunghyun Moon et al. |

It is certified that error appears in the above-identified patent and that said Letters Patent is hereby corrected as shown below:

In the Claims

Column 31, Line 60:
In Claim 3, delete "device," and insert -- device --.

Column 33, Line 21:
In Claim 14, delete "device," and insert -- device --.

Column 33, Line 33:
In Claim 15, delete "device," and insert -- device --.

Signed and Sealed this
Sixth Day of February, 2024

Katherine Kelly Vidal
*Director of the United States Patent and Trademark Office*